United States Patent
Jiang et al.

(10) Patent No.: US 12,093,668 B2
(45) Date of Patent: Sep. 17, 2024

(54) iOS APPLICATION PROGRAM CONSTRUCTION METHOD AND APPARATUS, ELECTRONIC DEVICE, AND STORAGE MEDIUM

(71) Applicant: BOE TECHNOLOGY GROUP CO., LTD., Beijing (CN)

(72) Inventors: Sujia Jiang, Beijing (CN); Kun Li, Beijing (CN)

(73) Assignee: BOE TEHCNOLOGY GROUP CO., LTD., Beijing (CN)

( * ) Notice: Subject to any disclaimer, the term of this patent is extended or adjusted under 35 U.S.C. 154(b) by 92 days.

(21) Appl. No.: 17/913,884

(22) PCT Filed: Nov. 12, 2021

(86) PCT No.: PCT/CN2021/130205
§ 371 (c)(1),
(2) Date: Sep. 23, 2022

(87) PCT Pub. No.: WO2022/170801
PCT Pub. Date: Aug. 18, 2022

(65) Prior Publication Data
US 2023/0236809 A1    Jul. 27, 2023

(30) Foreign Application Priority Data
Feb. 9, 2021   (CN) .......................... 202110181971.0

(51) Int. Cl.
*G06F 8/41*   (2018.01)
*G06F 8/20*   (2018.01)
(Continued)

(52) U.S. Cl.
CPC ................. *G06F 8/41* (2013.01); *G06F 8/20* (2013.01); *G06F 8/34* (2013.01); *G06F 8/36* (2013.01);
(Continued)

(58) Field of Classification Search
CPC ..... G06F 8/20; G06F 8/30; G06F 8/34; G06F 8/36; G06F 8/41; G06F 8/61; G06F 8/71; G06F 9/44; G06F 9/44526
See application file for complete search history.

(56) References Cited

U.S. PATENT DOCUMENTS

| | | | | |
|---|---|---|---|---|
| 2002/0156668 | A1* | 10/2002 | Morrow | G06Q 10/10 705/7.14 |
| 2003/0233631 | A1* | 12/2003 | Curry | G06F 8/20 717/115 |

(Continued)

FOREIGN PATENT DOCUMENTS

| | | |
|---|---|---|
| CN | 107832057 A | 3/2018 |
| CN | 110795078 A | 2/2020 |

(Continued)

OTHER PUBLICATIONS

Xcode, Wikipedia, 2020, 13 pages, [retrieved on Feb. 14, 2024], Retrieved from the Internet: <URL:http://dl.acm.org/>.*

(Continued)

*Primary Examiner* — Geoffrey R St Leger
(74) *Attorney, Agent, or Firm* — Chiwin Law LLC

(57) ABSTRACT

An iOS application program construction method and an apparatus, and electronic devices, and a storage medium are provided. The iOS application program construction method includes: configuring project information; based on the project information and at least one target component, utilizing a compilation management service and employing a script to configure a preset project, so as to obtain a target project; and packaging the target project by utilizing a packaging system to obtain an iOS application program corresponding to the target project.

17 Claims, 15 Drawing Sheets

(51) Int. Cl.
*G06F 8/34* (2018.01)
*G06F 8/36* (2018.01)
*G06F 8/61* (2018.01)
*G06F 8/71* (2018.01)
*G06F 9/44* (2018.01)
*G06F 9/445* (2018.01)

(52) U.S. Cl.
CPC ............... *G06F 8/61* (2013.01); *G06F 8/71* (2013.01); *G06F 9/44* (2013.01); *G06F 9/44526* (2013.01)

(56) References Cited

U.S. PATENT DOCUMENTS

| | | | | |
|---|---|---|---|---|
| 2006/0150148 | A1* | 7/2006 | Beckett | G06F 8/34 717/109 |
| 2008/0201453 | A1* | 8/2008 | Assenmacher | G06F 11/3664 709/219 |
| 2016/0092179 | A1 | 3/2016 | Straub | |
| 2016/0196120 | A1 | 7/2016 | Zhao | |
| 2016/0321067 | A1* | 11/2016 | Harrison | G06F 11/3604 |
| 2017/0123768 | A1* | 5/2017 | Liu | G06F 8/35 |
| 2018/0181378 | A1* | 6/2018 | Bakman | G06F 8/38 |

FOREIGN PATENT DOCUMENTS

| | | | |
|---|---|---|---|
| CN | 110851135 A | 2/2020 | |
| CN | 111399810 A | 7/2020 | |
| CN | 112882700 A | 6/2021 | |
| WO | WO-2015032129 A1 * | 3/2015 | ............... G06F 8/41 |
| WO | WO-2018036322 A1 * | 3/2018 | ............... G06F 8/31 |

OTHER PUBLICATIONS

Rogers, Michael P., et al., Storyboards: a graphical development tool for the rest of us, Journal of Computing Sciences in Colleges, May 2014, 8 pages, [retrieved on May 29, 2024], Retrieved from the Internet: <URL:http://dl.acm.org/>.*

Ramakrishnan, Pavithra, et al., iPhone application development using Xcode, ICUIMC '13: Proceedings of the 7th International Conference on Ubiquitous Information Management and Communication, Jan. 2013, 5 pages, [retrieved on May 29, 2024], Retrieved from the Internet: <URL:http://dl.acm.org/>.*

Rong Mu et al, "Design of automatic build server based on Jenkins WPS for iOS", Science and Technology & Innovation, Article #2095-6835, (2017) 18-0117-02 (cited in ISR).

* cited by examiner

FIG. 1A

FIG. 12B iOS APPLICATION PROGRAM CONSTRUCTION METHOD AND APPARATUS, ELECTRONIC DEVICE, AND STORAGE MEDIUM

This application is a U.S. National Phase Entry of International Application No. PCT/CN2021/130205, filed on Nov. 12, 2021, designating the United States of America and claiming priority to Chinese Patent Application No. 202110181971.0, filed on Feb. 9, 2021. The present application claims priority to and the benefit of the above-identified applications and the above-identified applications are incorporated by reference herein in their entirety.

TECHNICAL FIELD

Embodiments of the present disclosure relate to an iOS application program construction method and an apparatus, an electronic device, and a storage medium.

BACKGROUND

During the development process of an application program, the business logic inevitably becomes more and more complex as the functions increase. When there are many project codes, developers need to classify the project codes according to the business functions of different codes and divide the project codes into different business components, and this process is called componentization. When developing in a componentized way, a complex system can be split into a plurality of components, thereby separating component boundaries and responsibilities, facilitating independent upgrade and maintenance, avoiding the interaction between various businesses, and facilitating code reuse and project management, so as to improve the overall development efficiency of the team.

SUMMARY

At least one embodiment of the present disclosure provides an iOS application program construction method, and the method comprises: configuring project information; based on the project information and at least one target component, utilizing a compilation management service and employing a script to configure a preset project, so as to obtain a target project; and packaging the target project by utilizing a packaging system to obtain an iOS application program corresponding to the target project.

For example, in the method provided by an embodiment of the present disclosure, based on the project information and the at least one target component, utilizing the compilation management service and employing the script to configure the preset project, so as to obtain the target project, comprises: transmitting the project information to an operating system by utilizing the compilation management service, and generating the script based on the project information; and executing the script to configure the preset project based on the at least one target component, so as to obtain the target project.

For example, in the method provided by an embodiment of the present disclosure, executing the script to configure the preset project based on the at least one target component, so as to obtain the target project, comprises: executing the script to copy a template project to a preset folder, so as to obtain the preset project; executing the script to modify a name of the preset project, a name of the preset folder, an application program identification number, an application program version number, and an application program name; executing the script to inject an entry configuration code and bind an entry configuration component to a lifecycle management module of the preset project; executing the script to import image resources of an application icon and a launch image into the preset project; and executing the script to configure a dependency library management project. The target project is a project obtained after configuring the preset project.

For example, in the method provided by an embodiment of the present disclosure, the entry configuration code is configured to, after being compiled, execute: transmitting an entry template style to the entry configuration component by utilizing the compilation management service; sequentially importing the at least one target component into the entry configuration component, where the target component comprises a business component or a functional component; and introducing an entry component by utilizing the entry configuration component and causing the entry component to return to a sub-controller, and directing the sub-controller to a router controller of a main window.

For example, in the method provided by an embodiment of the present disclosure, introducing the entry component by utilizing the entry configuration component and causing the entry component to return to the sub-controller, and directing the sub-controller to the router controller of the main window, comprises: importing the entry template style, content of the target component, an order of the target component, and an icon and a name corresponding to the target component into the entry component by utilizing the entry configuration component; causing the entry component to return to the sub-controller; and directing the sub-controller to the router controller of the main window by utilizing the entry configuration component.

For example, in the method provided by an embodiment of the present disclosure, the router controller of the main window is of TabBar type.

For example, in the method provided by an embodiment of the present disclosure, the entry configuration component further introduces a lifecycle component, the lifecycle component comprises a module array, and the module array comprises a class of the target component; and the lifecycle component is configured to receive a lifecycle management message from the lifecycle management module through the entry configuration component, determine a target component that needs to be notified based on the class of the target component, and forward the lifecycle management message to the target component that needs to be notified.

For example, in the method provided by an embodiment of the present disclosure, configuring the project information comprises: configuring the project information by utilizing an information receiving entry provided by an open platform.

For example, in the method provided by an embodiment of the present disclosure, the project information comprises at least one selected from a group consisting of: an application program name, an application program identification number, an application program version number, uniform resource location splicing of an application icon, resource name splicing of the application icon, uniform resource location splicing of a launch image, resource name splicing of the launch image, a project name, a package name, a name of a public library, a version of the public library, name splicing of a private library, address splicing of the private library, and version splicing of the private library.

For example, in the method provided by an embodiment of the present disclosure, configuring the project information by utilizing the information receiving entry provided by the open platform, comprises: jumping to an application management interface in response to receiving a click instruction for an application management icon provided by the open platform; and in response to receiving a click instruction for a save icon of a creating application tab page of the application management interface, acquiring the project information input in a dialog box of the creating application tab page, so as to implement configuration of the project information. The dialog box is the information receiving entry provided by the open platform.

For example, in the method provided by an embodiment of the present disclosure, packaging the target project by utilizing the packaging system to obtain the iOS application program corresponding to the target project comprises: accessing the packaging system, executing the script to modify a packaging theme and a packaging mode, and packaging the target project, so as to obtain the iOS application program.

For example, the method provided by an embodiment of the present disclosure further comprises: uploading the iOS application program to an open platform, and generating a download identification for downloading the iOS application program.

For example, in the method provided by an embodiment of the present disclosure, the download identification is a two-dimensional code.

For example, the method provided by an embodiment of the present disclosure further comprises: establishing a private library based on a dependency library management project component template.

For example, in the method provided by an embodiment of the present disclosure, codes of the private library are stored in a code repository, and the private library comprises a plurality of business components and a plurality of functional components.

For example, the method provided by an embodiment of the present disclosure further comprises: establishing the template project by utilizing an integrated development tool.

For example, in the method provided by an embodiment of the present disclosure, the template project comprises a content.jason file, and the conten.jason file is configured to perform instrumentation of the image resources of the application icon and the launch image.

At least one embodiment of the present disclosure further provides an iOS application program construction apparatus, and the apparatus comprises: an information processing unit, configured to configure project information; a project processing unit, configured to, based on the project information and at least one target component, utilize a compilation management service and employ a script to configure a preset project, so as to obtain a target project; and a packaging unit, configured to package the target project by utilizing a packaging system to obtain an iOS application program corresponding to the target project.

At least one embodiment of the present disclosure further provides an electronic device, which comprises: a processor; and a memory, which comprises one or more computer program modules. The one or more computer program modules are stored in the memory and configured to be executed by the processor, and the one or more computer program modules comprise instructions for implementing the iOS application program construction method provided by any one of the embodiments of the present disclosure.

At least one embodiment of the present disclosure further provides a storage medium for storing non-transitory computer-readable instructions. When executed by a computer, the non-transitory computer-readable instructions are capable of implementing the iOS application program construction method provided by any one of the embodiments of the present disclosure.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

Figure 1A:
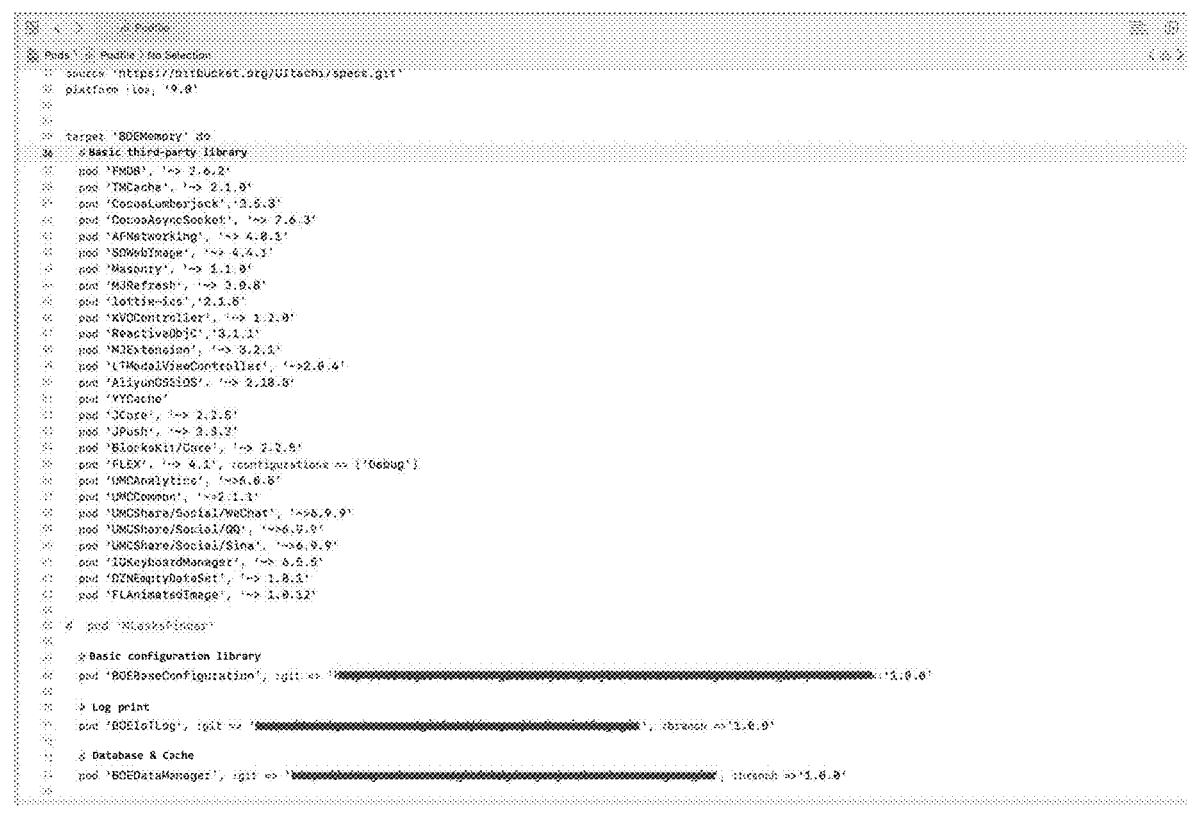

FIG. 1A and FIG. 1B are schematic diagrams of an interface for utilizing Xcode to construct a project;

FIG. 12B is a schematic diagram of an interface for managing components in an iOS application program construction method provided by some embodiments of the present disclosure;

DETAILED DESCRIPTION

Figure 1B:
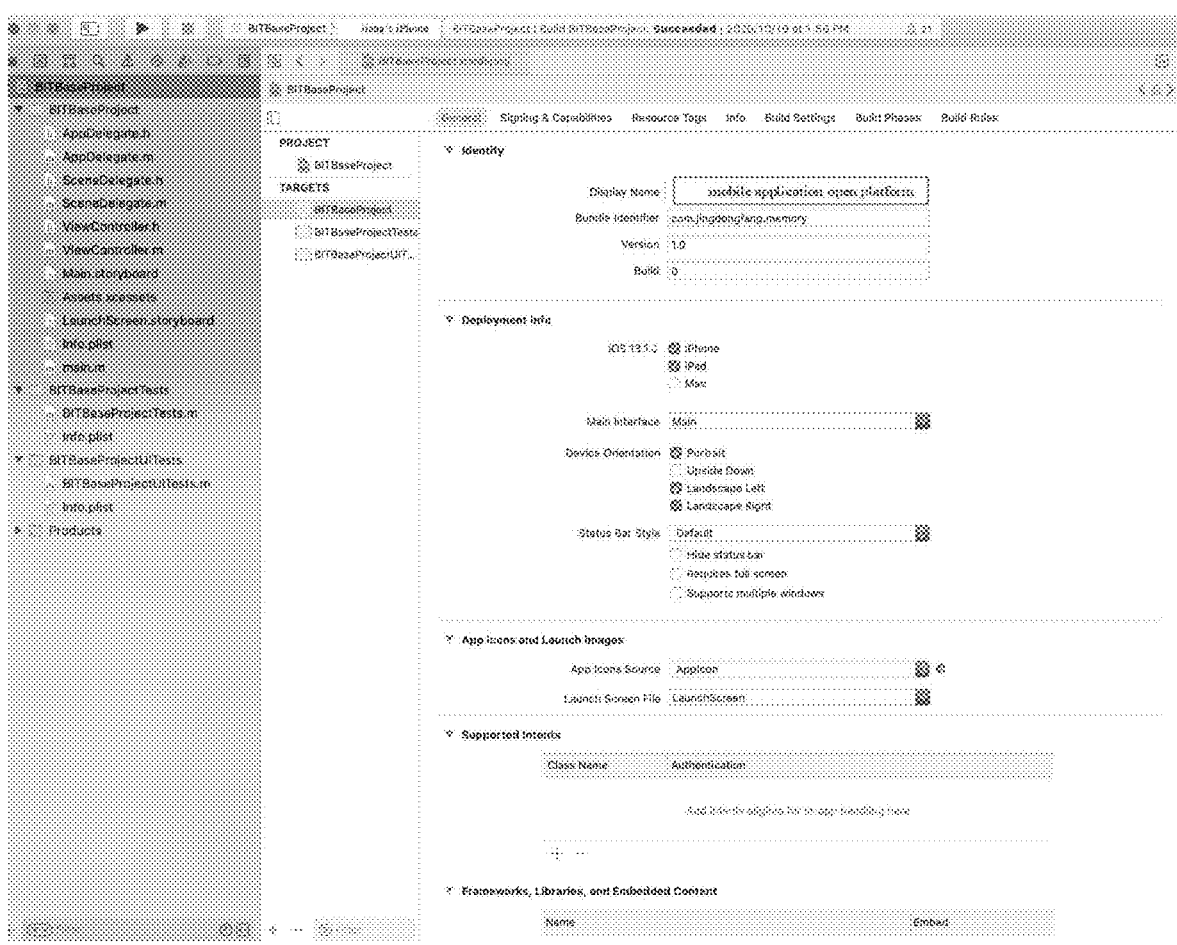

In order to make objects, technical details, and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," and similar terms are not intended to indicate any sequence, amount, or importance, but to distinguish various components. Also, the terms such as "a," "an," "the," etc., are not intended to limit the amount, but to indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The terms "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

With the increase of development demands, in order to facilitate the development of an application program, a componentized platform is used. When using the componentized platform for componentized construction, it is necessary to extract the CocoaPods library through the existing business, and at the same time import the business code and the componentized library into the project, and the business components are associated with each other through a router. CocoaPods is one of the package management tools for iOS, which is widely used in the development of the iOS application program to manage a dependency library, such as managing a third-party library.

However, the usual componentized construction method makes the main project have a lot of dependencies on the business code and the lifecycle of the application program. For example, TabBarController is a router controller that depends on the main window. The development for the TabBarController can only be carried out within the business project, resulting in a large amount of repetitive codes every time a new project is created, which increases the workload. In fact, many business functions have versatility, and the initialization process may be basically the same, but data dependencies can lead to duplication of development.

Typically, Xcode is used to construct a project to develop an iOS application program. The Xcode is an integrated development tool that runs on the operating system macOS. Utilizing the Xcode can quickly develop macOS and iOS application programs. The Xcode has a unified user interface design, and coding, testing, and debugging are all done in a simple window.

FIG. 1A and FIG. 1B are schematic diagrams of an interface for utilizing the Xcode to construct a project. As illustrated in FIG. 1A and FIG. 1B, when developing an iOS application program, the Xcode needs to be used to construct the project. For example, the user first needs to start the Xcode and create a new project. Then, the CocoaPods library is manually configured in the interface illustrated in FIG. 1A. Next, a series of manual configurations are performed, such as writing codes, importing components, etc. Then, the lifecycle configuration is performed in the interface illustrated in FIG. 1B, and the lifecycle of each component is manually associated with the class in the project for lifecycle management. Next, image resources of an application icon and a launch image are imported. After the above-mentioned series of manual configurations, the configured project is packaged and released. For example, several parameters also need to be manually configured during packaging and releasing. After completing the packaging and releasing, the iOS application program is generated.

Every time an iOS application program is developed, the operations described above need to be repeated, which adds a lot of repetitive workloads. In the case where a plurality of projects needs to be upgraded and maintained and there are more and more new projects, this repetitive work loses a lot of development time and causes a lot of work pressure on developers, which is not conducive to improving development efficiency.

At least one embodiment of the present disclosure provides an iOS application program construction method and an apparatus, an electronic device, and a storage medium. The iOS application program construction method provides an automated component construction process, which can solve the problem of coupling of the main project, enable the main project to be templated without any business code, realize insensible packaging, avoid developers from manually configuring projects, reduce the workload of componentized application construction, and improve the development efficiency.

Hereinafter, the embodiments of the present disclosure are described in detail with reference to the drawings. It should be noted that the same reference numbers in different drawings are used to refer to the same elements that have been described.

At least one embodiment of the present disclosure provides an iOS application program construction method. The iOS application program construction method includes: configuring project information; based on the project information and at least one target component, utilizing a compilation management service and employing a script to configure a preset project, so as to obtain a target project; and packaging the target project by utilizing a packaging system to obtain an iOS application program corresponding to the target project.

Figure 2:
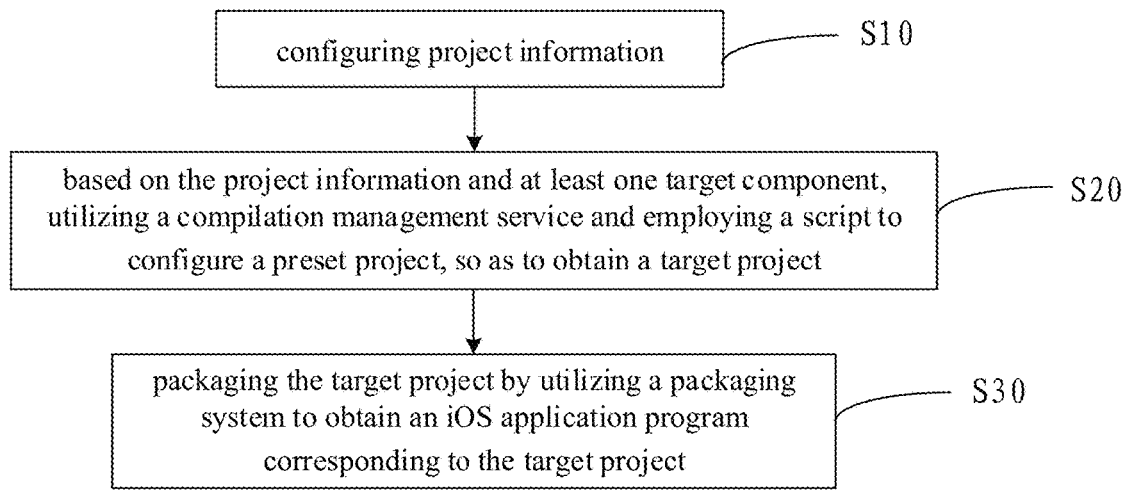
FIG. 2 is a schematic flowchart of an iOS application program construction method provided by some embodiments of the present disclosure.

FIG. 2 is a schematic flowchart of an iOS application program construction method provided by some embodiments of the present disclosure. For example, as illustrated in FIG. 2, in some embodiments, the iOS application program construction method includes following operations.

Step S10: configuring project information;

step S20: based on the project information and at least one target component, utilizing a compilation management service and employing a script to configure a preset project, so as to obtain a target project;

step S30: packaging the target project by utilizing a packaging system to obtain an iOS application program corresponding to the target project.

Figure 3:
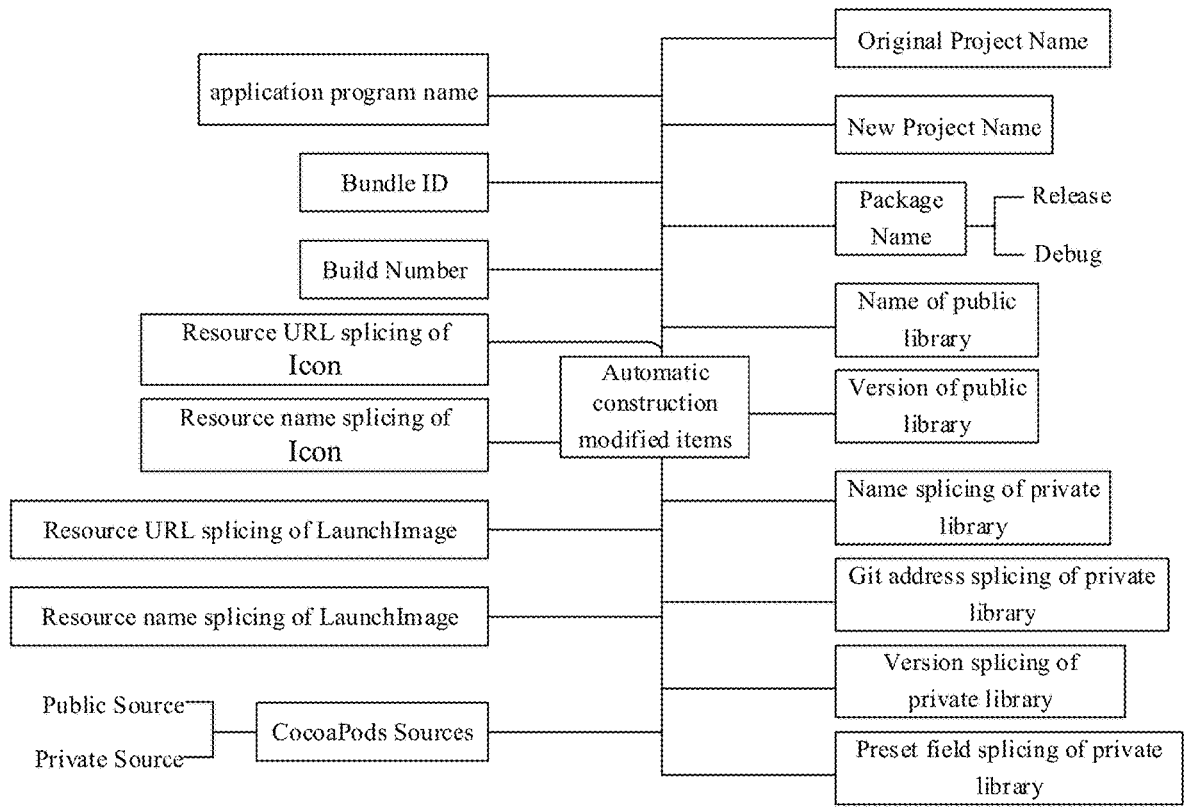
FIG. 3 is a schematic diagram of automatically constructing modified items in an iOS application program construction method provided by some embodiments of the present disclosure.

For example, in step S10, corresponding project information needs to be configured for the iOS application program to be developed. For example, as illustrated in FIG. 3, the project information includes at least one selected from the group consisting of: the application program name, the application program identification number (Bundle ID), the application program version number (Build number), the uniform resource location splicing (resource URL splicing) of the application icon, the resource name splicing of the application icon, the uniform resource location splicing of the launch image, the resource name splicing of the launch image, the project name, the package name, the name of the public library, the version of the public library, the name splicing of the private library, the address splicing of the private library, and the version splicing of the private library.

For example, the Cocoapods is used to manage the dependency library, and CocoaPods sources include public source and private source. The public sources include a public library, and the public library may be any open-source third-party library. The private sources include a private library, and the private library may be a third-party library established by users locally or on the server side that is only used by specific users. For example, the codes of the private library are stored in a git repository, so it is needed to configure the git address splicing of the private library. In the case where the codes of the private library are stored in other code repositories, the address splicing of the private library is also adapted accordingly.

For example, in order to provide flexibility, a preset field splicing of the private library is further configured, and the preset field can be set by the user to meet the diverse development demands of the user. For example, the "new project name" illustrated in FIG. 3 is the project name in the project information that is configured, and the "original project name" illustrated in FIG. 3 is the name of the template project, which is fixed. The template project will be described in detail later and will not be repeated here. The package name (that is, the "package name" illustrated in FIG. 3) may be divided into two categories to be set separately, for example, the package name is set separately for the Release version and the Debug version.

It should be noted that, in the embodiments of the present disclosure, the project information is not limited to the information listed above, and may also include other types of information, which may be determined according to actual requirements and is not limited in the embodiments of the present disclosure.

The above-mentioned project information may also be referred to as automatic construction modified items, that is, each time the iOS application program construction method provided by the embodiments of the present disclosure is executed, the project information needs to be modified and configured for the iOS application program to be developed.

For example, in some examples, configuring the project information includes configuring the project information by utilizing an information receiving entry provided by an open platform. For example, the open platform is a platform for componentized development, and the open platform is of a B/S architecture or a C/S architecture. In the case where the open platform is of a B/S architecture, the developer can log in to a web page of the open platform with a browser and fill in the project information in the web page, and the open platform receives the project information to complete the configuration of the project information. In this case, the information receiving entry provided by the open platform is a dialog box used to fill in the project information in the web page. In the case where the open platform is of a C/S architecture, the developer can start a client and fill in the project information in an interface of the client, and the open platform receives the project information to complete the configuration of the project information. In this case, the information receiving entry provided by the open platform is a dialog box used to fill in the project information in the interface of the client.

For example, the open platform provides ideas to maintaining for developers and non-developers. On the one hand, the maintenance of components and the logic of automatic construction are performed from the perspective of developers; on the other hand, the function of automatically packaging and querying prior art is provided for non-developers. In this way, the query time for developers to query the capabilities provided by the prior art is saved, a visual maintenance method is provided, and a visual function prediction is also provided for non-developers.

Figure 4:
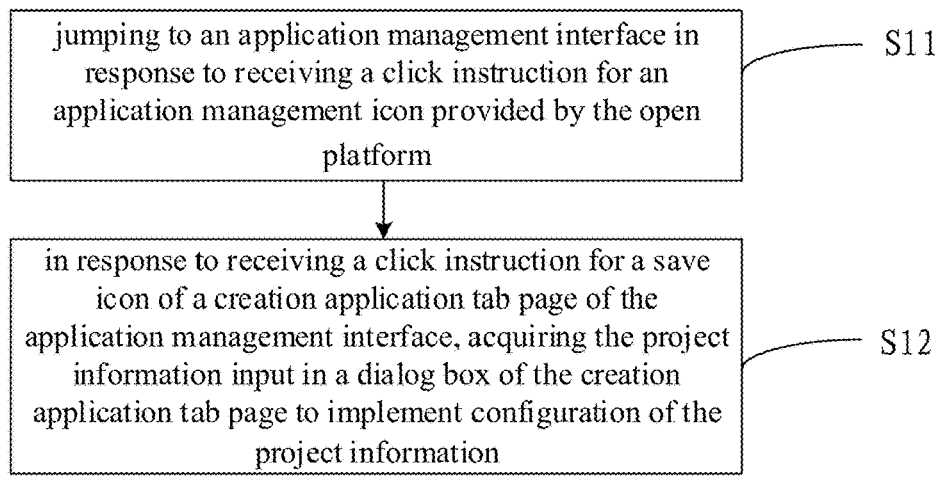
FIG. 4 is a schematic flowchart of step S10 in FIG. 2.

For example, in some examples, as illustrated in FIG. 4, configuring the project information by utilizing the information receiving entry provided by the open platform includes following operations.

Step S11: jumping to an application management interface in response to receiving a click instruction for an application management icon provided by the open platform;

step S12: in response to receiving a click instruction for a save icon of a creation application tab page of the application management interface, acquiring the project information input in a dialog box of the creation application tab page to implement configuration of the project information.

For example, taking the case where the open platform is of a B/S architecture as an example, the above-mentioned steps S11-S12 are described below with reference to the schematic diagrams of an interface illustrated in FIG. 5A and FIG. 5B.

Figure 5A:
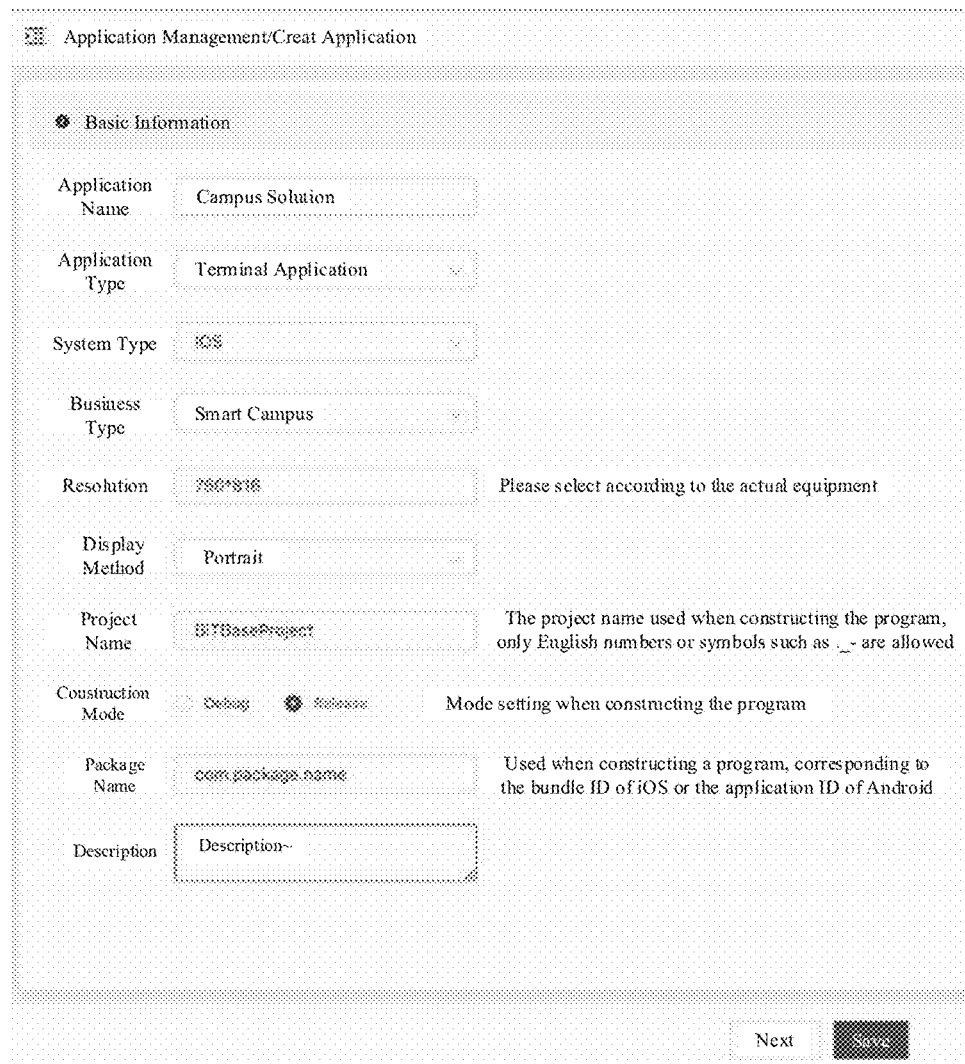
FIG. 5A and FIG. 5B are schematic diagrams of an interface for configuring project information in an iOS application program construction method provided by some embodiments of the present disclosure.

For example, in step S11, the developer clicks the application management icon provided by the open platform after logging in to the web page of the open platform, and the server providing the web page, after receiving the click instruction for the application management icon, jumps to the application management interface illustrated in FIG. 5A.

For example, in step S12, the developer inputs the project information in a dialog box of the creation application tab page of the application management interface. In this case, the dialog box is the information receiving entry provided by the open platform. For example, as illustrated in FIG. 5A, the creation application tab page provides a plurality of dialog boxes for the developer to input various project information, such as "application name", "application type", "system type" and other information. By sliding the vertical scroll bar on this page, as illustrated in FIG. 5B, the plurality of dialog boxes can further be used by the developer to configure the application icon and the launch image. When the input of various project information is completed, as illustrated in FIG. 5B, the developer clicks the save icon. After receiving the click instruction on the save icon, the server acquires the project information input in respective dialog boxes, so as to implement the configuration of the project information.

Figure 5B:
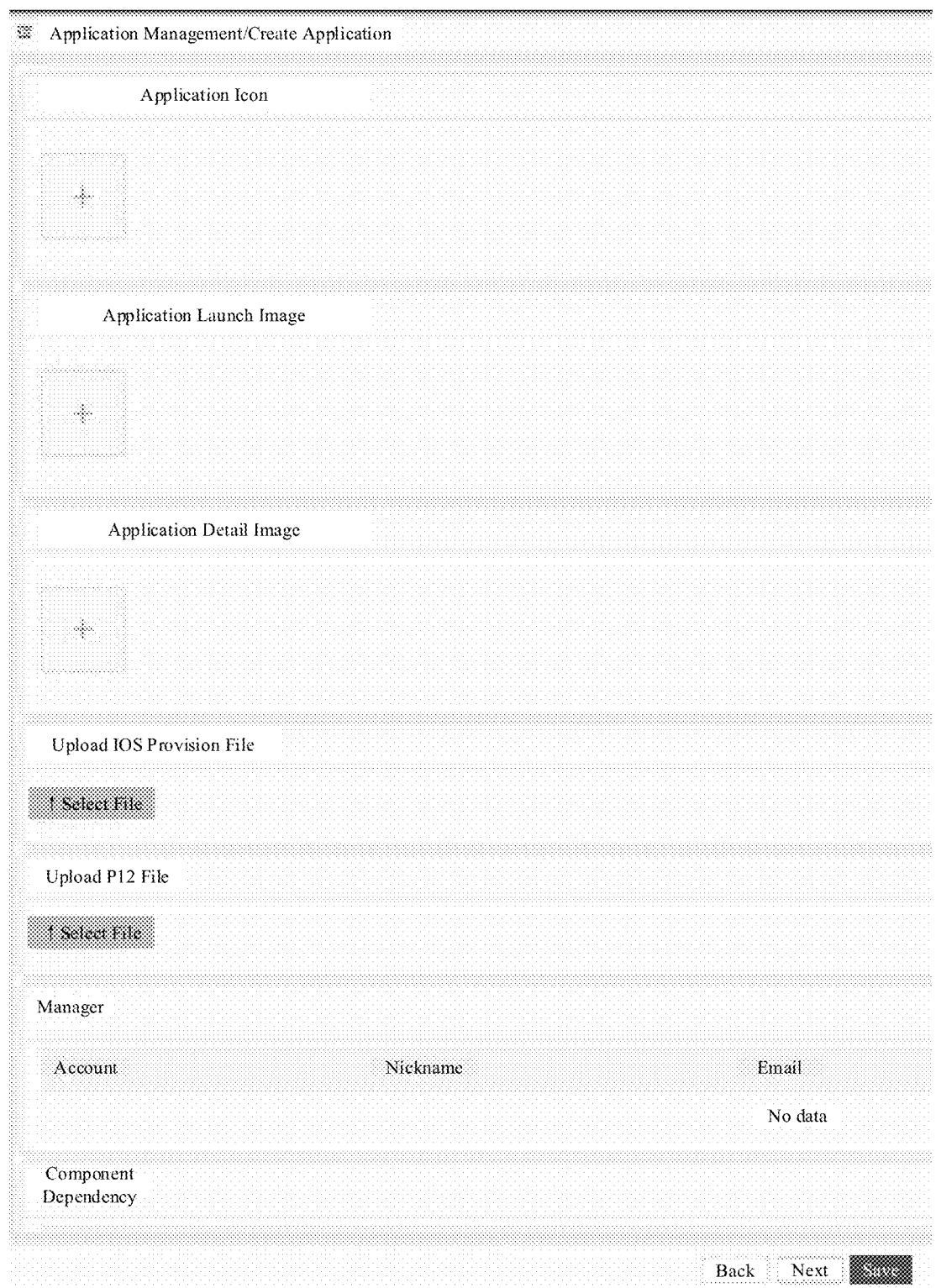

It should be noted that the interfaces and the contents in the interfaces illustrated in FIG. 5A and FIG. 5B are only illustrative and not limitative. According to actual requirements, other types of interfaces may be used to implement the configuration of project information, which is not limited by the embodiments of the present disclosure.

Figure 5C:
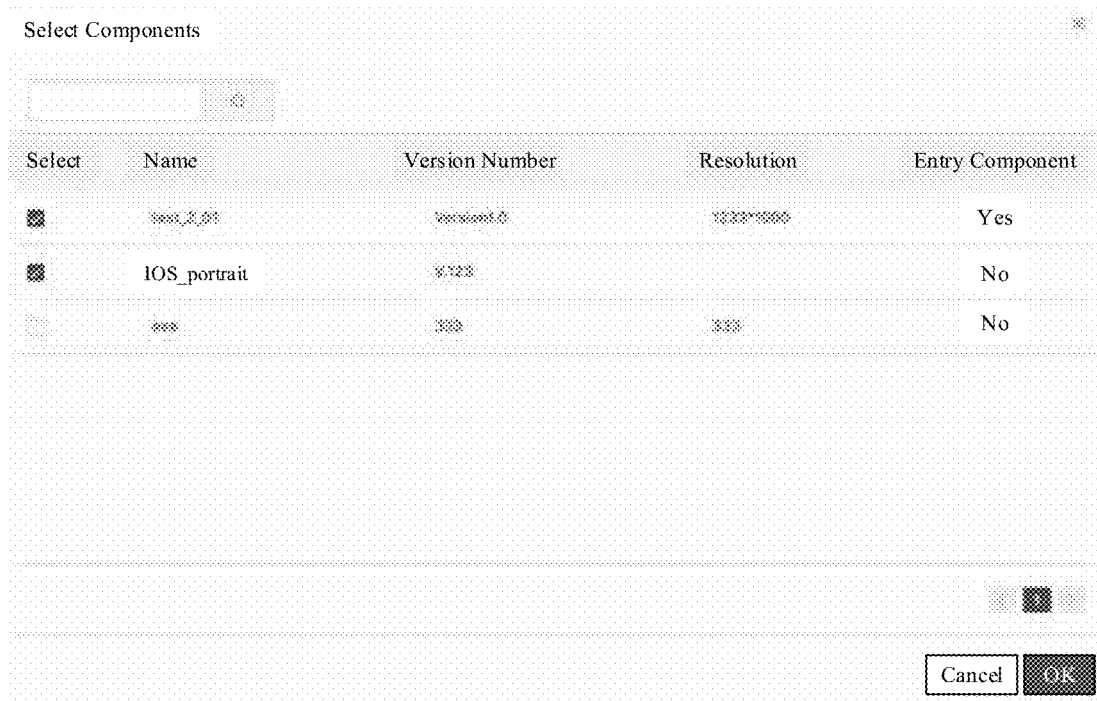
FIG. 5C is a schematic diagram of an interface for selecting components in an iOS application program construction method provided by some embodiments of the present disclosure.

For example, when configuring the project information, a component that needs to be used is further selected, and the component is, for example, a reusable code repository abstracted out in advance. For example, the business component and/or the functional component that needs to be used are selected. The business component can provide an interface and has one or more functions, which can be separately used as a standard module spliced into the application program. The functional component can provide one or more functions for a native application program, such as uploading, downloading, power control, Bluetooth, and other functions. For example, as illustrated in FIG. 5C, when configuring the project information, the developer can enter the interface for selecting components, and check the component that needs to be used, and the selection of components is completed after confirmation. It should be noted that, in the embodiments of the present disclosure, the component that needs to be used is also called a target component.

For example, as illustrated in FIG. 2, in step S20, based on the project information and at least one target component, the preset project is configured by utilizing the compilation management service and employing the script, so as to obtain the target project.

Figure 6:
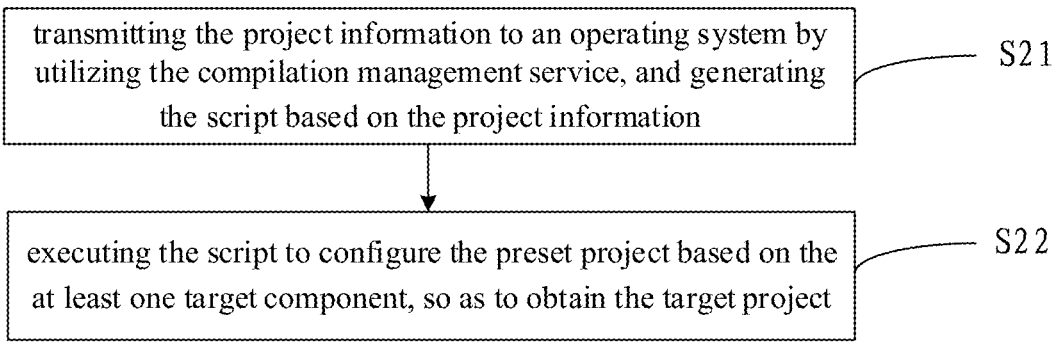
FIG. 6 is a schematic flowchart of step S20 in FIG. 2.

For example, in some examples, as illustrated in FIG. 6, the above-mentioned step S20 includes following operations.

Step S21: transmitting the project information to an operating system by utilizing the compilation management service, and generating the script based on the project information;

step S22: executing the script to configure the preset project based on the at least one target component, so as to obtain the target project.

For example, in step S21, the compilation management service is Jenkins. After the configuration of the project information is completed by utilizing the interface of the open platform, the open platform can access a resource server through Jenkins, and transmit the project information to the operating system of the resource server. For example, the resource server runs a macOS system. For example, Jenkins can be deployed on the resource server or can be deployed on other servers, which is determined according to actual requirements and not limited in the embodiments of the present disclosure. After receiving the project information, the resource server generates the script based on the project information. The script is an executable file that can be executed by the operating system of the resource server, and the script includes executable commands and the project information to be used.

For example, in some examples, the computer used by the developer can only be connected to the internal local area network (LAN), but cannot be connected to the Internet. Therefore, the developer can independently apply for permission to fix the IP address, so as to obtain the permission to connect to the external network (Internet), and provide convenient network dependency for subsequent operations. The IP address is fixed through the intranet (the internal LAN), the server (that is, the aforementioned resource server) running the macOS system is established, and Jenkins is deployed on the server. Thus, the open platform can directly access Jenkins and transmit parameters to Jenkins.

For example, in step S22, the operating system of the resource server executes the script, and implements the configuration of the preset project by executing the script, thereby obtaining the target project. The process of executing the script does not require manual operations by developers or other users, and the project configuration can be performed automatically by executing the script. For example, the preset project is a project that needs to be modified and configured, and the preset project is a project obtained by copying a template project. The preset project is configured by executing the script, and the target project is obtained after the configuration is completed, that is, the target project is the project obtained after configuring the preset project.

Figure 7:
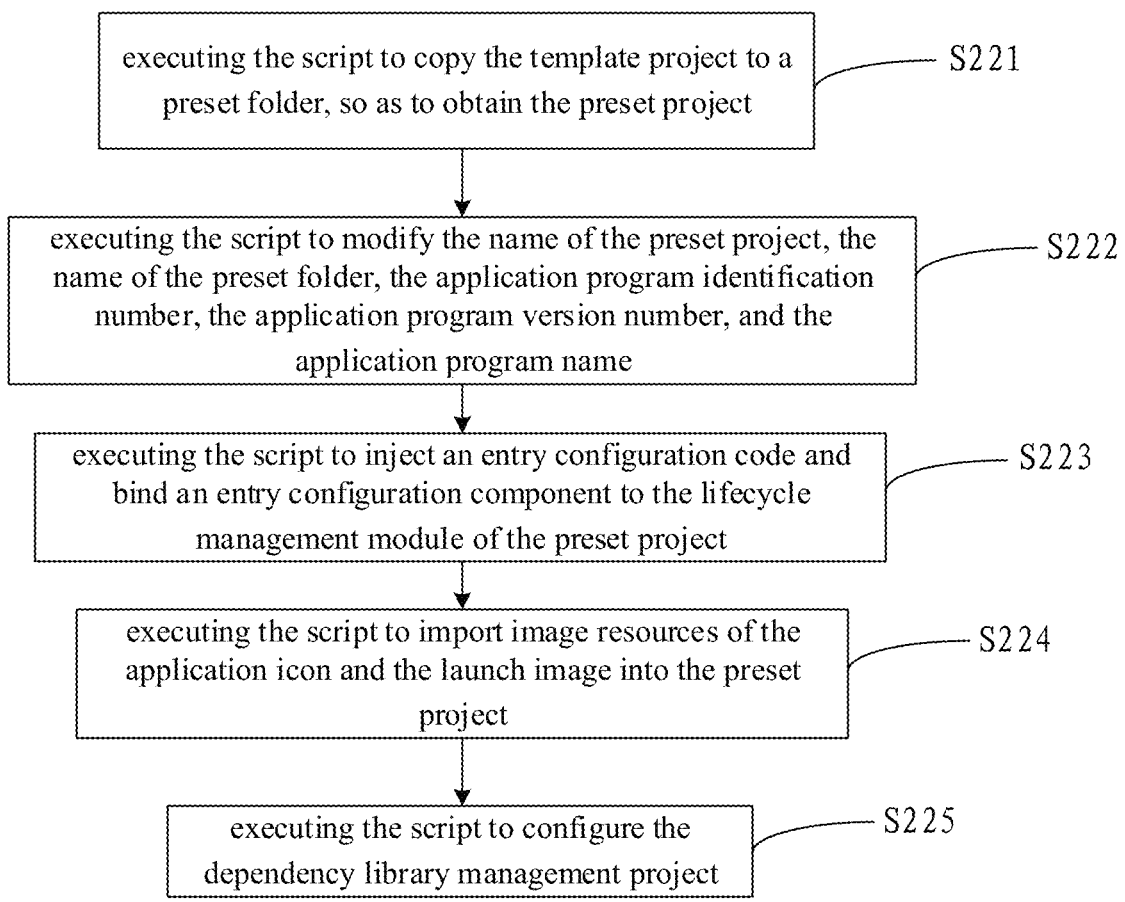
FIG. 7 is a schematic flowchart of step S22 in FIG. 6.

For example, in some examples, as illustrated in FIG. 7, the above-mentioned step S22 includes following operations. That is, the specific process of executing the script to configure the preset project is as follows.

Step S221: executing the script to copy the template project to a preset folder, so as to obtain the preset project;

step S222: executing the script to modify the name of the preset project, the name of the preset folder, the application program identification number, the application program version number, and the application program name;

step S223: executing the script to inject an entry configuration code and bind an entry configuration component to the lifecycle management module of the preset project;

step S224: executing the script to import image resources of the application icon and the launch image into the preset project;

step S225: executing the script to configure the dependency library management project.

It should be noted that, the above-mentioned steps S221-S225 are all implemented by executing the script, and the manual operations by developers or other users are not required. The script includes executable commands and project information to be used, so the operations of the above-mentioned steps S221-S225 can be implemented by executing the script.

For example, in step S221, the script is executed to copy the template project to the preset folder to obtain the preset project. For example, the template project is a pre-established project, and each time the iOS application program construction method is executed, the template project is copied to the preset folder, and the copied project is the preset project, so as to facilitate the subsequent configuration of the preset project. For example, in some examples, the template project is established by using Xcode. For example, the preset folder is a folder with any path, for example, a folder for storing a newly developed project, which is not limited in the embodiments of the present disclosure. Copying the template project and configuring the copied project can avoid modifying the template project and avoid affecting the next construction of the application program.

For example, in step S222, the script is executed to modify the name of the preset project, the name of the preset folder, the application program identification number, the application program version number, and the application program name. For example, the script is executed to modify the name of the preset project to the aforementioned new project name, modify the application program identification number to the aforementioned Bundle ID, modify the application program version number to the aforementioned Build number, modify the application program name according to the aforementioned name of the application program, and modify the name of the preset folder. For example, the information has been acquired in step S10 and written into the generated script. For example, the xcargs instruction and the rename instruction can be used to modify the above-mentioned information.

For example, in step S223, the script is executed to inject the entry configuration code and bind the entry configuration component to the lifecycle management module of the preset project. It should be noted that, because the compilation is not performed in step S233, the injected entry configuration code is currently only pseudocode and has not been actually called.

For example, the entry configuration code includes the code corresponding to the entry configuration component and the code corresponding to the component (i.e., the target component) selected by the developer, and further includes the code for implementing the overall logic and flow or other required code, etc.

For example, the entry configuration component (also called the ConfigEntry component) is mainly used to associate the configuration entry with the business component and/or the functional component, thus satisfying the binding restriction of the Xcode entry configuration to bind the router controller (routerController) of the main window to the business component and/or the functional component. For example, the entry configuration component is specifically designed for the iOS application program to be developed this time, so that a suitable binding method can be provided according to the business requirements of this development.

For example, the entry configuration component is equivalent to a template configuration component, which can provide the logic of automatic scanning. For example, in some examples, the entry configuration component matches the TabBar, thus adapting to the classic tabbed layout to provide wider applicability and compatibility. Of course, the embodiments of the present disclosure are not limited to this, and the entry configuration component may also be matched with other types of application program layouts, for example, matched with classic layouts such as list type, matrix type, etc., which are determined according to actual requirements, and the embodiments of the present disclosure do not limit this.

Figure 8:
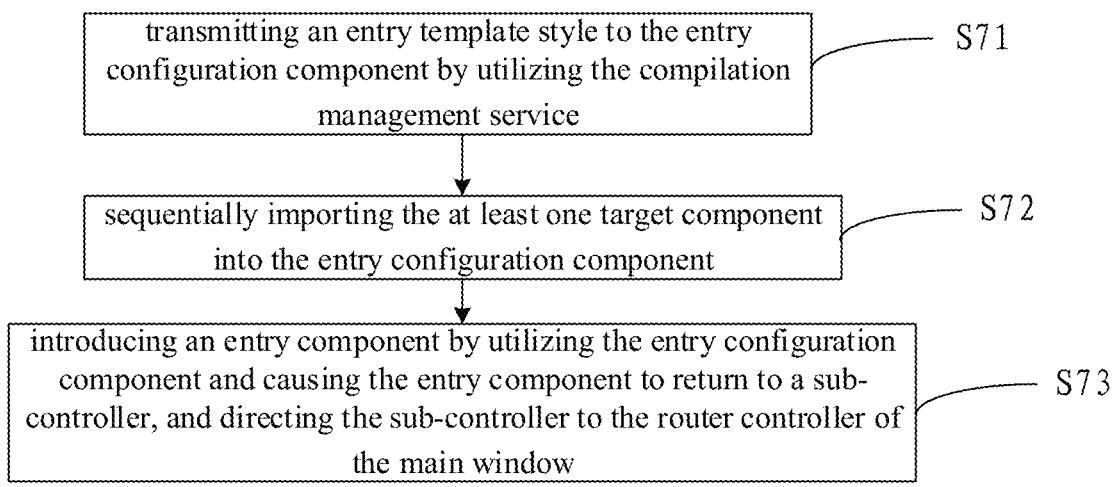
FIG. 8 is a flowchart of operations executable after the entry configuration code is compiled in an iOS application program construction method provided by some embodiments of the present disclosure.

For example, as illustrated in FIG. 8, the entry configuration code is configured to execute the following operations after being compiled.

Step S71: transmitting an entry template style to the entry configuration component by utilizing the compilation management service;

step S72: sequentially importing the at least one target component into the entry configuration component;

step S73: introducing an entry component by utilizing the entry configuration component and causing the entry component to return to a sub-controller, and directing the sub-controller to the router controller of the main window.

For example, in step S71, the compilation management service is Jenkins, and in this step, the entry template style is transmitted to Jenkins, and then transmitted to the entry configuration component through Jenkins. For example, the entry template style is a template style pre-selected and determined by the developer. For example, the entry configuration component provides an entry to receive the entry template style.

For example, in step S72, at least one target component is sequentially imported into the entry configuration component. The target component includes the business component or the functional component, and the amount of the target components is one or more. Because the developer selects the component to be used when configuring the project information, and the selected component is the target component, in this case, at least one previously selected target component can be sequentially imported into the entry configuration component. For example, the entry configuration component provides an entry to receive the target components, and then imports the target components into the corresponding template according to the order.

For example, in step S73, the entry component is introduced by utilizing the entry configuration component and returned to the sub-controller, and the sub-controller is directed to the router controller of the main window. For example, the entry configuration component may introduce one entry component, which is a fixed functional component, and the entry component is different from the entry configuration component.

Figure 9:
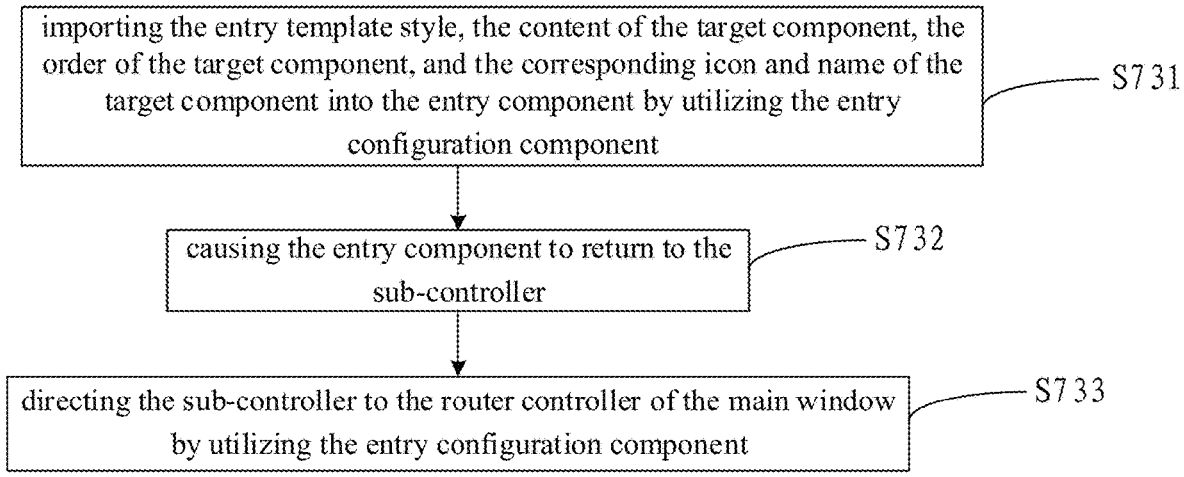
FIG. 9 is a schematic flowchart of step S73 in FIG. 8.

For example, in some examples, as illustrated in FIG. 9, the above-mentioned step S73 includes following operations.

Step S731: importing the entry template style, the content of the target component, the order of the target component, and the corresponding icon and name of the target component into the entry component by utilizing the entry configuration component;

step S732: causing the entry component to return to the sub-controller;

step S733: directing the sub-controller to the router controller of the main window by utilizing the entry configuration component.

For example, in step S731, because the entry configuration component introduces the entry component, the entry template style, the content of the target component, the order of the target component, and the corresponding icon and name of the target component can be imported into the entry component by utilizing the entry configuration component. In step S732, the entry component is returned to the sub-controller, that is, the entry component returns a controller of an entry to the entry configuration component. In step S733, the sub-controller is directed to the router controller of the main window by utilizing the entry configuration component, that is, the controller returned to the entry configuration component is directed to the router controller of the main window through the entry configuration component. In the above way, each business component or functional component can be associated with the router controller, so that the main interface can be displayed.

For example, in some examples, the router controller of the main window is of type TabBar, and in this case, the entry configuration component matches the TabBar. Of course, the embodiments of the present disclosure are not limited to this, and the router controller of the main window may also be any other type, which can be determined according to actual requirements.

In the above way, it is possible to automatically scan components, associate the components with router controllers, and distribute business requirements to respective components, thus implementing automatic configuration of business interfaces and implementing componentized project development without developing within the main project, and there is no substantial code in the main project.

Figure 10:
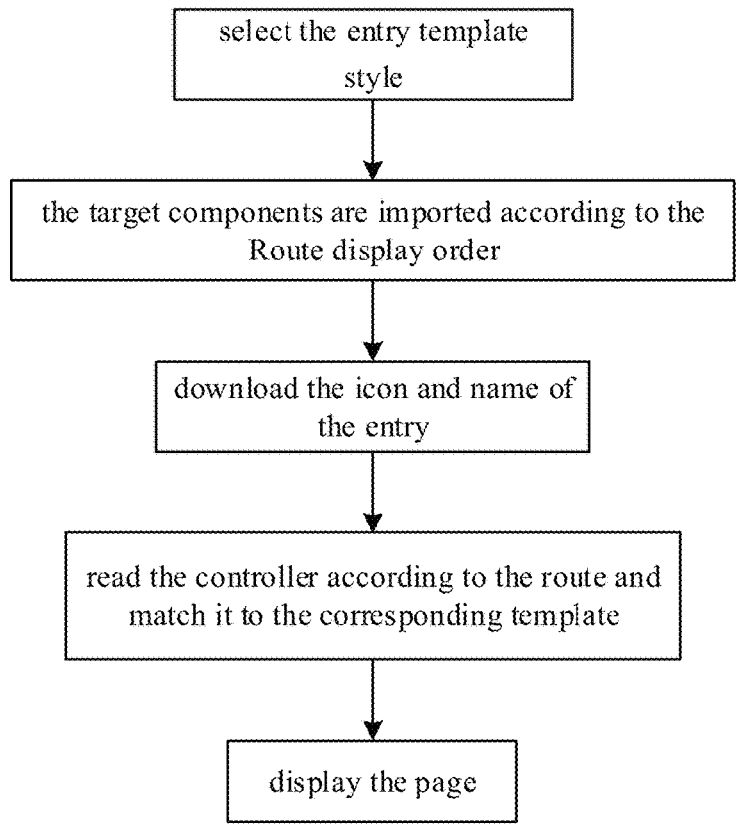
FIG. 10 is a schematic flowchart of automatically scanning components in an iOS application program construction method provided by some embodiments of the present disclosure.

FIG. 10 is a schematic flowchart of automatically scanning components in an iOS application program construction method provided by some embodiments of the present disclosure. As illustrated in FIG. 10, in some examples, the entry template style is first selected and transmitted in through Jenkins. Next, respective components are imported according to the order of route display. Then, the icon and name of the entry are downloaded. Next, the controller is read according to the route and is matched to the corresponding template. Finally, the page display is performed. This process is basically the same as the above-mentioned steps S71-S73, and is not repeated here.

For example, as illustrated in FIG. 7, in step S223, after injecting the entry configuration code, the entry configuration component is bound to the lifecycle management module of the preset project. For example, AppDelegate and SceneDelegate of the main project can be found, and the AppDelegate and SceneDelegate are the above-mentioned lifecycle management modules. The AppDelegate is used to manage the application program lifecycle (App lifecycle), and the SceneDelegate is used to manage the user interaction lifecycle (UI lifecycle). Then the sed is used to bind the logic related to the entry configuration component about the UI lifecycle and the App lifecycle.

For example, in some examples, an entry configuration component introduces a lifecycle component. The lifecycle component is a component used to forward and transmit lifecycle management messages. The lifecycle component not only interfaces with the lifecycle management module in Xcode, but also interfaces with respective business components or functional components, thereby implementing the lifecycle distribution. For example, the lifecycle component includes a module array that includes a class of the target component. The lifecycle component is configured to receive the lifecycle management message from the lifecycle management module through the entry configuration component, determine the target component that needs to be notified based on the class of the target component, and forward the lifecycle management message to the target component that needs to be notified.

For example, the module array is all files registered to AppModulesRegister.plist in the main project, and the module array includes the class of the business component or functional component that needs to execute the lifecycle. When the application program is running, in the case where the main project receives the notification of the lifecycle change from the system, the lifecycle management module (i.e., AppDelegate and SceneDelegate) receives the notification, and then send the corresponding lifecycle management message to the entry configuration component, and then the entry configuration component sends the lifecycle management message to the lifecycle component. Then, the lifecycle component queries the classes registered in AppModulesRegister.plist according to the received lifecycle management message. By querying, the class that needs to be distributed can be known, i.e., the target component that needs to be notified can be determined. Then, the class that needs to be distributed executes the corresponding agent to implement the message distribution through the message forwarding mechanism of macOS. Each business component or functional component also introduces a lifecycle component. Thus, the lifecycle management message can be received.

In the above way, each time the lifecycle changes, the entry configuration component notifies the lifecycle component, the lifecycle component notifies the target component in an agent way, and the target component receives the message to perform further operations. Each business component and functional component maintains its own lifecycle without coupling logic with the main project, which is convenient for maintenance and management.

For example, as illustrated in FIG. 7, in step S224, the script is executed to import image resources of the application icon and the launch image into the preset project, thereby implementing the instrumentation of the image resources of the application icon and the launch image.

For example, as illustrated in FIG. 7, in step S225, the script is executed to configure the dependency library management project. For example, the dependency library management project is the CocoaPods library. When configuring the CocoaPods library, pod init is performed to generate a pod configuration file, the source is entered into the Podfile through the script, the source addresses of the public library and private library are provided, and the name and version of the public library are preset into the project. There is no business code in the main project, and the private library automatically downloads the public library that the private library depends on, so in the case that there is no need to add additional public libraries, the configuration of the public library is not performed. The private library may include at least one of a business component library, a basic function dependency library, and a Flutter library stored in git, and may also include other types of libraries, which are not limited in the embodiments of the present disclosure. The private library and/or public library are packaged into pods libraries and are directly introduced through Cocoapods. For example, the CocoaPods library supports the pulling of branch, tag, and commit at the same time, and can be injected into different library nodes according to different scenarios. Because the developer selects the components to be used when configuring the project information, the required components can be pulled by configuring the CocoaPods library.

After performing steps S10 and S20 in FIG. 2, that is, after configuring the project information and executing the script to configure the preset project, the target project is obtained, and the target project corresponds to the iOS application program to be developed. Next, the target project is packaged to obtain the iOS application program.

For example, as illustrated in FIG. 2, in the step S30, the target project is packaged by utilizing the packaging system to obtain the iOS application program corresponding to the target project. For example, the step S30 further includes: accessing the packaging system, executing the script to modify the packaging theme and packaging mode, and packaging the target project, so as to obtain the iOS application program. For example, the fastlane packaging system is accessed, and then the script is executed to modify the packaging theme (that is, modify the scheme) and packaging mode, so that the target project is packaged to obtain the corresponding iOS application program. For example, the iOS application program is a file in ipa format, which can be installed in a terminal device running the iOS system. It should be noted that the packaging system is not limited to fastlane, and may also be any applicable packaging system, which may be determined according to actual requirements, and the embodiments of the present disclosure are not limited thereto. For example, the script can further be executed to configure some parameters required for packaging, such as configuring the Manifest configuration parameter downloaded through the Safari browser.

In the iOS application program construction method provided by the embodiments of the present disclosure, by configuring the project information, executing the script to configure the preset project to obtain the target project, packaging the target project, and other operations, the construction of the componentized iOS application program is completed, and the iOS application program to be developed is obtained. In the whole operation process, only configuring the project information requires the developer to operate, while configuring the preset project, packaging the target project and other operations do not require the developer to participate. These operations are all implemented by executing the script, which can avoid the developer from manually configuring projects, avoid the developer from listing duplicate codes every time a new project is created, and omit the process of the developer manually associating the CocoaPods library, modifying the project, and importing the component library, thereby reducing the workload of application construction, and improving the development efficiency. Furthermore, the operation of configuring the project information only requires the developer to fill in the relevant project information, and does not require the development of code and logic, which can reduce the workload of the developer and improve the development efficiency. The iOS application program construction method provides an automated component construction process, which can automatically import the business component and/or functional component, associate each component with the router controller, and distribute the lifecycle to each component, thereby solving the problem of coupling of the main project, enabling the main project to be templated without any business code. Moreover, the packaging process does not require manual operations by the developer, and can achieve insensible packaging.

Figure 11:
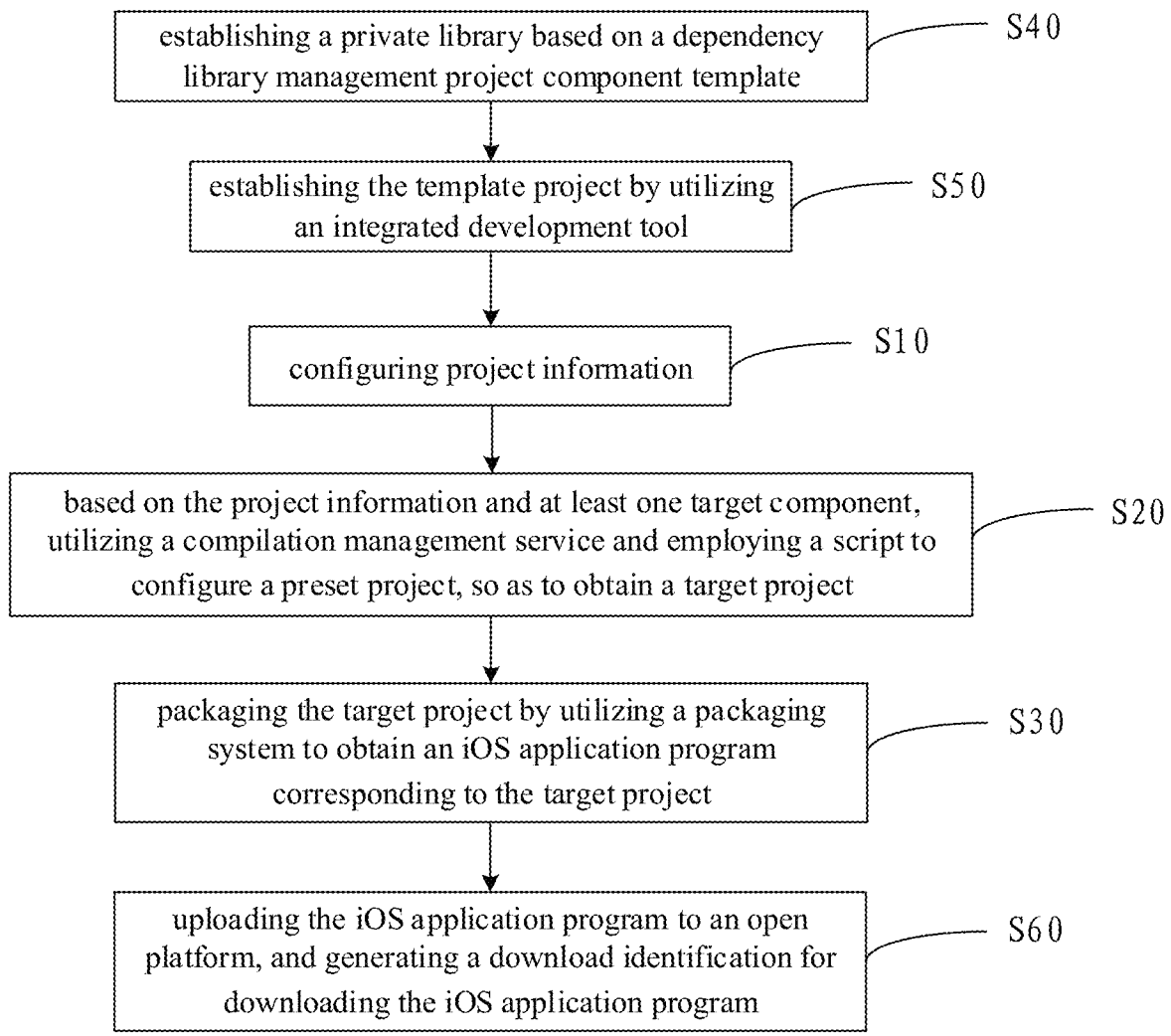
FIG. 11 is a schematic flowchart of another iOS application program construction method provided by some embodiments of the present disclosure.

FIG. 11 is a schematic flowchart of another iOS application program construction method provided by some embodiments of the present disclosure. As illustrated in FIG. 11, in some embodiments, the iOS application program construction method includes following operations.

Step S40: establishing a private library based on a dependency library management project component template;

step S50: establishing the template project by utilizing an integrated development tool;

step S10: configuring project information;

step S20: based on the project information and at least one target component, utilizing a compilation management service and employing a script to configure a preset project, so as to obtain a target project;

step S30: packaging the target project by utilizing a packaging system to obtain an iOS application program corresponding to the target project;

step S60: uploading the iOS application program to an open platform, and generating a download identification for downloading the iOS application program.

For example, the above-mentioned steps S10-S30 are basically the same as the steps S10-S30 in the iOS application program construction method illustrated in FIG. 2 and will not be repeated here.

For example, in step S40, the dependency library management project component template is, for example, a CocoaPods component template, and the private library is established based on the CocoaPods component template. For example, a CocoaPods component template is first newly created, the code that can be extracted into a library is imported into the library, the code is stored in the class folder through the entry provided by CocoaPods, the library file is stored in the code repository (such as the git repository) by modifying the .podspec index, and after configuring the tags and branches, the index is verified through pod lib lint, and then pod trunck to the library index git. Thus, the establishment of the private library is completed. When using the private library, the library can be pulled into the required project by introducing the git address and branch of the pod. It should be noted that the method and process of establishing the private library are not limited to the methods and processes described above, and any applicable method and process can be used to establish the private library, which can be determined according to actual requirements, and the embodiments of the present disclosure do not limit this.

For example, the code of the private library is stored in a code repository, and the code repository can be a git repository. The private library includes a plurality of business components and a plurality of functional components. For example, after completing the establishment of the private library, by binding the pods index library of the component, and the git address and the git version of the component, and choosing whether to serve as the entry configuration component, the components (such as business components and functional components) in the private library are pulled into the system of the open platform by utilizing the component management system of the open platform. The developer can select the business components and functional components that need to be used in the interface provided by the open platform when constructing the iOS application program.

Figure 12A:
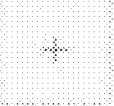
FIG. 12A is a schematic diagram of an interface for creating components in an iOS application program construction method provided by some embodiments of the present disclosure.

FIG. 12A is a schematic diagram of an interface for creating components in an iOS application program construction method provided by some embodiments of the present disclosure. For example, the component management icon provided by the open platform is clicked to jump to the component management interface illustrated in FIG. 12A. Then, the relevant information of the component is filled in a creation component tab page of the component management interface, and after clicking the "Submit" icon, the component is created in the open platform, that is, the corresponding component in the private library is pulled into the system of the open platform.

Figure 12B:
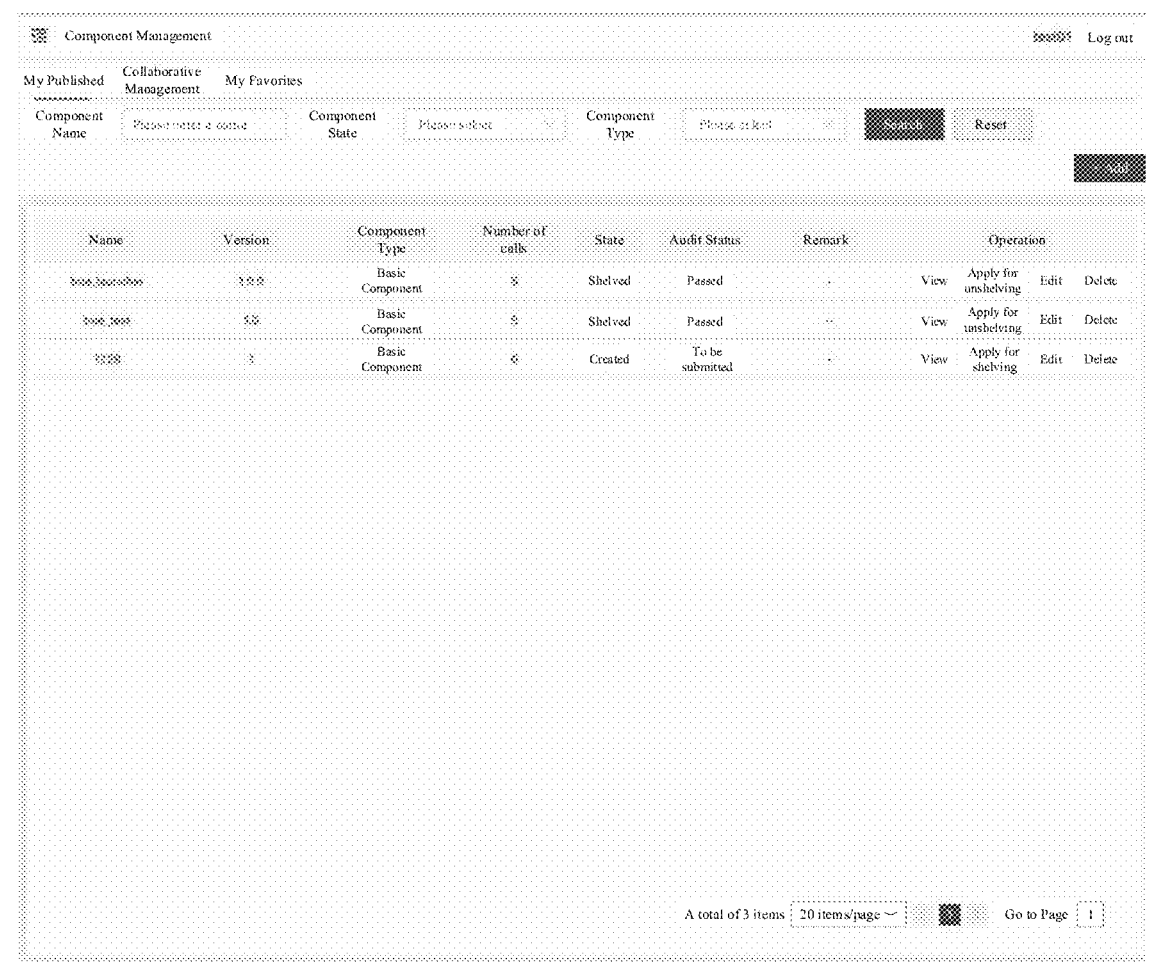

FIG. 12B is a schematic diagram of an interface for managing components in an iOS application program construction method provided by some embodiments of the present disclosure. As illustrated in FIG. 12B, in the component management interface, the components pulled into the system can also be managed, for example, viewing the information of the components, editing or deleting the components, applying for shelving or not shelving, etc. For example, a description detail page for the component is provided to facilitate the developer to query the component. Therefore, it is convenient for the developer to manage the component and visualize the component.

The above method can facilitate users (such as product managers, project managers, testers, etc.) to view the existing business logic, avoid the redundant workload of designing the same business repeatedly, and visualize the component management.

For example, as illustrated in FIG. 11, in step S50, the template project is established by utilizing an integrated development tool. The integrated development tool may be Xcode, or any other applicable development tool, which is not limited to the embodiments of the present disclosure. The template project is used for subsequent copying to generate the preset project, so that the script can be executed to configure the preset project.

For example, when using Xcode, a project is newly created with a fixed name, the fixed name is set according to user requirements, and the fixed name is the aforementioned "original project name". In order to provide greater compatibility and flexibility to be applicable to the presets of various templates, such as access to Flutter, access to RN, etc., the script modify entry of the original template can be reserved. The project is set with a fixed name, minimum version support, fastlane configuration, and preset Build number. It should be noted that if the Build number is not preset in advance, when PlistBuddy is used to modify it later, the update may fail because the CURRENT PROJECT VERSION field cannot be queried. Furthermore, because it cannot be lower than the original version when modifying, the value of the Build number is preset to 0.

Icon and launch image (LaunchImage) are set in the main project of the project, two resource file packages, i.e., AppIcon.appiconset and LaunchImage.launchimage, are generated under Assets.xcassets. These two resource file packages match the content.json file according to different hardware devices at the same time, which can automatically scan the icon and launch image. In order to solve the problem that the script automatically overwrites the image, the content.json files are copied from the two resource file packages, the original image resources used to generate the above resource file packages are deleted, and then the copied content.json files are put into the above resource file packages. In the subsequent execution of the script to configure the preset project, the instrumentation of the images can be performed one by one, and the configuration of the application icon and launch image is automatically configured.

After the above-mentioned operations, the template project is established, and the template project is stored in a preset storage path. For example, the template project includes the content.jason file, and the conten.jason file is configured to perform instrumentation of the image resources of the application icon and launch image.

When the script needs to be executed to configure the preset project, the template project is copied, and the copied template project is used as the preset project and is configured. Thereby, the original template project is not changed, so that the original template project can be used every time the iOS application program is constructed.

For example, as illustrated in FIG. 11, in step S60, the iOS application program is uploaded to the open platform, and the download identification for downloading the iOS application program is generated. For example, the download identification is a two-dimensional code. For example, the two-dimensional code is displayed to the user in an installable entry provided by the open platform. Of course, the embodiments of the present disclosure are not limited to this, and the download identification may be any type of identification as long as it can be used to download the iOS application program. For example, the resource server generates the iOS application program and then sends the iOS application program to the open platform and uploads the iOS application program to the open platform. When developers or other users need to download the iOS application program, they can download the iOS application program from the open platform by scanning the download identification, and install the iOS application program on a mobile terminal (such as a mobile phone), which is convenient and quick.

Figure 13:
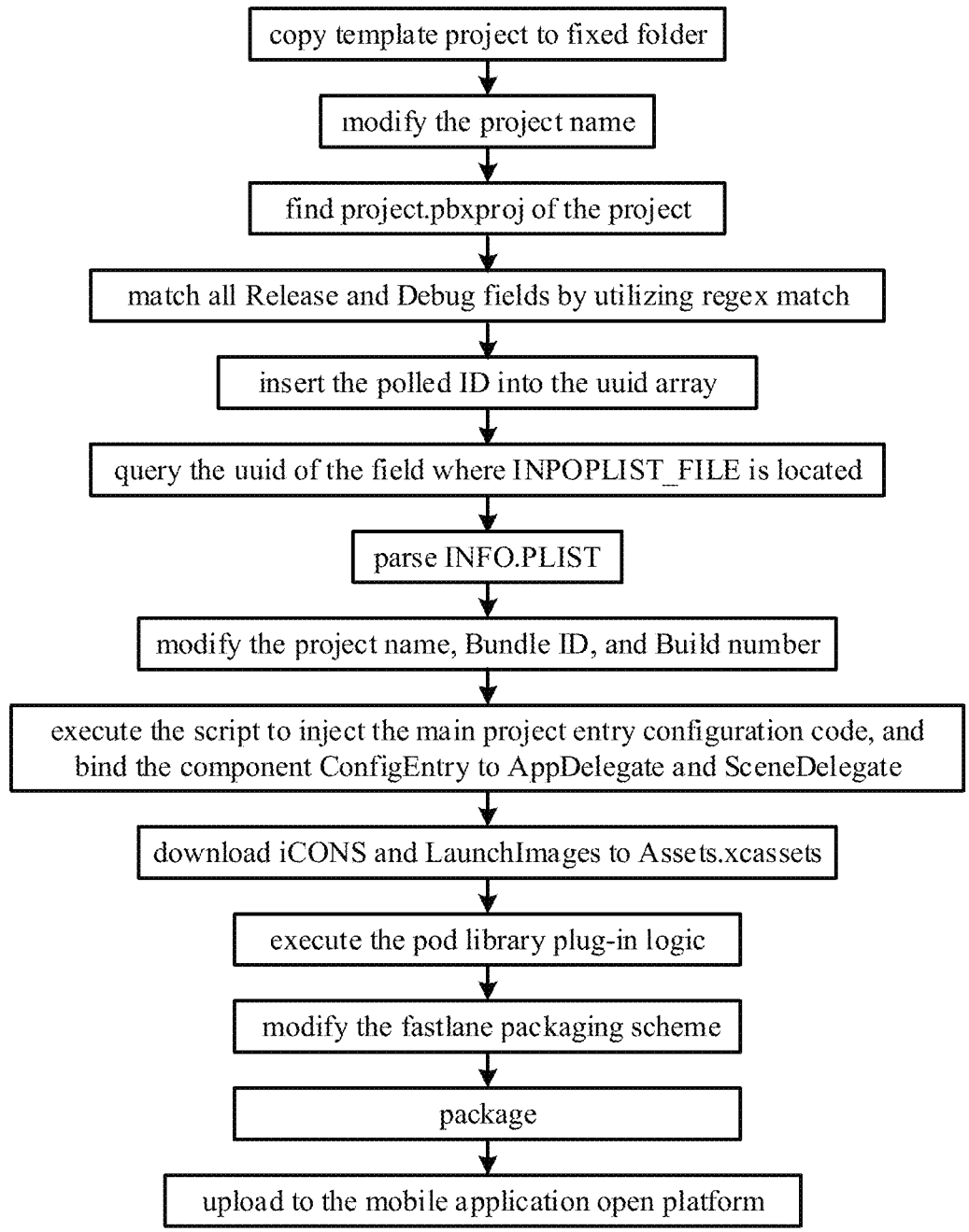
FIG. 13 is a schematic flowchart of yet another iOS application program construction method provided by some embodiments of the present disclosure.

FIG. 13 is a schematic flowchart of yet another iOS application program construction method provided by some embodiments of the present disclosure. In some examples, as illustrated in FIG. 13, a script is first executed to copy a template project to a fixed folder (e.g., a preset folder) to obtain a preset project. Then the script is executed to modify and configure the preset project. For example, the project name is modified and the project.pbxproj file in the project is looked up. The project.pbxproj file saves the tree structure, maintains the relationship between the class of the Xcode project and the project, and the association of some configurations. All Release and Debug fields are matched by utilizing regex match, and the polled ID is inserted into the uuid array. Then the uuid of the field where INPOPLIST FILE is located is queried to find the absolute folder path of INFO.PLIST corresponding to all Targets. INFO.PLIST is parsed, PRODUCT NAME (AppName, that is, the project name), PRODUCT BUNDLE IDENTIFIER (Bundle ID), and CURRENT PROJECT VERSION (Build number) are looked up, then the project name, Bundle ID, and Build number are modified. Then the script is executed to inject the entry configuration code of the main project, and the entry configuration component (ConfigEntry) is bound to the lifecycle management modules (AppDelegate and SceneDelegate) of the preset project. Then the application icon and the launch image are downloaded to Assets.xcassets, and then the Pod library plug-in logic is executed. Then the fastlane packaging theme is modified, the packaging is performed, and a file in ipa format is generated and uploaded to the open platform.

Thus, the construction of the iOS application program is completed, and the user can scan the two-dimensional code provided by the open platform to download the corresponding iOS application program. Each operation illustrated in FIG. 13 is implemented by executing the script, which does not require manual configuration and operation by the developer, reduces the workload of the developer, and improves development efficiency.

The above method can realize the automatic construction of the iOS application program, automatically distribute the components, project configuration, icons and other information to the project according to the developer's configuration in the interface of the open platform, complete one-click packaging, and provide users with the two-dimensional code for download and installation, and the corresponding iOS application program can be installed by scanning the two-dimensional code.

Figure 14:
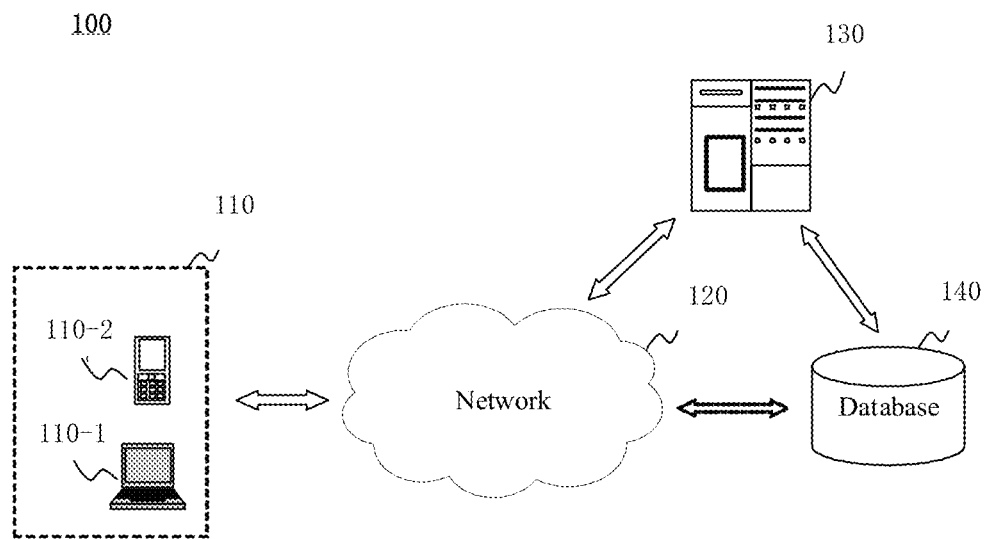
FIG. 14 is a schematic diagram of a system that is capable of implementing the iOS application program construction method provided by the embodiments of the present disclosure.

FIG. 14 is a schematic diagram of a system that is capable of implementing the iOS application program construction method provided by the embodiments of the present disclosure. As illustrated in FIG. 14, the system 100 may include a user terminal 110, a network 120, a server 130, and a database 140. For example, the system 100 is capable of implementing the iOS application program construction method provided by any embodiment of the present disclosure.

The user terminal 110 is, for example, a computer 110-1. It is understood that the user terminal 110 may be any other type of electronic device capable of performing data processing, which may include, but is not limited to, a desktop computer, a notebook computer, a tablet computer, a workstation, and the like. The user terminal 110 may also be any equipment provided with an electronic device. The embodiments of the present disclosure do not limit the hardware configuration or software configuration of the user terminal.

The user can utilize the browser of the user terminal 110 to log in to the webpage of the open platform, or enter the interface of the native application program of the user terminal 110, and configure the project information in the corresponding webpage or interface. Then, the project information is transmitted to the server 130 through the network 120. Jenkins is deployed on the server 130, and the server 130 runs the macOS operating system. The server 130 executes the script based on the received project information to configure the preset project based on at least one target component, obtains the target project after the configuration is completed, packages the target project, and uploads the ipa format file of the iOS application program generated by packaging to the open platform. The user terminal 110 further includes a cell phone 110-2. The user scans the two-dimensional code provided by the open platform with the mobile phone 110-2, so as to download the corresponding iOS application program. Thus, the iOS application program construction method provided by the embodiments of the present disclosure is executed, thereby implementing the rapid construction of the iOS application program.

The network 120 is a single network, or a combination of at least two different networks. For example, the network 120 includes, but is not limited to, one or a combination of a local area network, a wide area network, a public network, a private network, and the like.

The server 130 is a single server, or a server farm, and respective servers in the server farm are connected with each other through a wired or wireless network. The server farm may be centralized, such as a data center, or may be distributed. The server 130 is local or remote.

The database 140 generally refers to a device having a storage function. The database 140 is mainly used for storing various data used, generated and output by the user terminal 110 and the server 130 in the work. The database 140 is local or remote. The database 140 includes various memories, such as a random access memory (RAM), a read-only memory (ROM), and the like. The storage devices mentioned above are just some examples, and the storage devices that can be used in the system 100 are not limited thereto.

The database 140 is interconnected or communicated with the server 130 or a part thereof via the network 120, or is interconnected or communicated directly with the server 130, or a combination of the above two.

In some examples, the database 140 is a stand-alone device. In other examples, the database 140 is also integrated into at least one of the user terminal 110 and the server 130. For example, the database 140 is set on the user terminal 110 or on the server 130. For another example, the database 140 is also distributed, a part of which is set on the user terminal 110 and the other part is set on the server 130. The embodiments of the present disclosure do not limit the type of the database, for example, the database is a relational database or a non-relational database.

At least one embodiment of the present disclosure further provides an iOS application program construction apparatus. The iOS application program construction apparatus provides an automated component construction process, which can solve the problem of coupling of the main project, enable the main project to be templated without any business code, realize insensible packaging, avoid developers from manually configuring projects, reduce the workload of componentized application construction, and improve the development efficiency.

Figure 15:
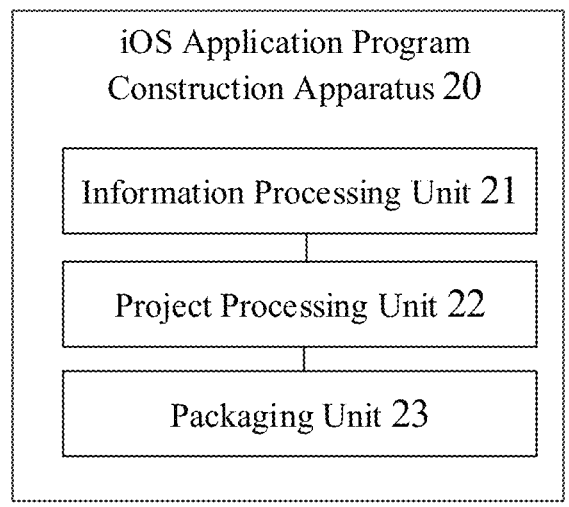
FIG. 15 is a schematic block diagram of an iOS application program construction apparatus provided by some embodiments of the present disclosure.

FIG. 15 is a schematic block diagram of an iOS application program construction apparatus provided by some embodiments of the present disclosure. As illustrated in FIG. 15, the iOS application program construction apparatus 20 includes an information processing unit 21, a project processing unit 22, and a packaging unit 23. For example, the iOS application program construction apparatus 20 is applied to the user terminal, and is also applied to any device or system that needs to construct the iOS application program, which is not limited by the embodiments of the present disclosure.

The information processing unit 21 is configured to configure the project information. For example, the information processing unit 21 can perform the step S10 of the iOS application program construction method illustrated in FIG. 2. The project processing unit 22 is configured to, based on the project information and at least one target component, utilize the compilation management service and employ the script to configure the preset project, so as to obtain the target project. For example, the project processing unit 22 can perform the step S20 of the iOS application program construction method illustrated in FIG. 2. The packaging unit 23 is configured to package the target project by utilizing the packaging system to obtain the iOS application program corresponding to the target project. For example, the packaging unit 23 can perform the step S30 of the iOS application program construction method illustrated in FIG. 2.

For example, each of the information processing unit 21, the project processing unit 22, and the packaging unit 23 is hardware, software, firmware, and any feasible combination thereof. For example, each of the information processing unit 21, the project processing unit 22, and the packaging unit 23 is a dedicated or general circuit, a chip, or a device, etc., or is a combination of a processor and a memory. Regarding the specific implementation forms of the information processing unit 21, the project processing unit 22, and the packaging unit 23, the embodiments of the present disclosure do not limit this.

It should be noted that, in the embodiments of the present disclosure, each unit of the iOS application program construction apparatus 20 corresponds to each step of the aforementioned iOS application program construction method. The specific functions of the iOS application program construction apparatus 20 may be referred to the above relevant description of the iOS application program construction method, which will not be repeated here. The components and structures of the iOS application program construction apparatus 20 illustrated in FIG. 15 are only exemplary and not restrictive, and the iOS application program construction apparatus 20 may further include other components and structures as required.

At least one embodiment of the present disclosure further provides an electronic device, and the electronic device includes a processor and a memory. One or more computer program modules are stored in the memory and configured to be executed by the processor, and the one or more computer program modules include instructions for implementing the iOS application program construction method provided by any embodiment of the present disclosure. The electronic device provides an automated component construction process, which can solve the problem of coupling of the main project, enable the main project to be templated without any business code, realize insensible packaging, avoid developers from manually configuring projects, reduce the workload of componentized application construction, and improve the development efficiency.

Figure 16:
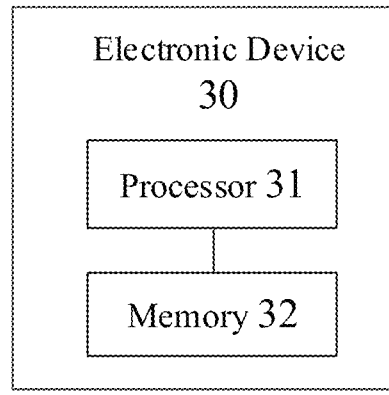
FIG. 16 is a schematic block diagram of an electronic device provided by some embodiments of the present disclosure.

FIG. 16 is a schematic block diagram of an electronic device provided by some embodiments of the present disclosure. As illustrated in FIG. 16, the electronic device 30 includes a processor 31 and a memory 32. The memory 32 is used to store non-transitory computer-readable instructions (e.g., one or more computer program modules). The processor 31 is configured to execute the non-transitory computer-readable instructions, and when the non-transitory computer-readable instructions are executed by the processor 31, one or more steps in the above-mentioned iOS application program construction method can be executed. The memory 32 and the processor 31 are interconnected by a bus system and/or another form of connection mechanism (not illustrated). For example, the iOS application program construction method according to the embodiments of the present disclosure is implemented by an application program running in the operating system of the electronic device 30, or implemented by accessing a web site provided by a cloud server through a browser installed in the operating system.

For example, the processor 31 is a central processing unit (CPU), a graphics processing unit (GPU), a digital signal processor (DSP), or another form of processing unit with data processing capabilities and/or program execution capabilities, such as a field programmable gate array (FPGA), etc. For example, the central processing unit (CPU) is of an X86 or ARM architecture, etc. The processor 31 is a general purpose processor or a special purpose processor, and can control other components in the electronic device 30 to perform desired functions.

For example, the memory 32 includes any combination of one or more computer program products, and the computer program products include various forms of computer-readable storage media, such as a volatile memory and/or a nonvolatile memory. The volatile memory includes, for example, a random access memory (RAM) and/or a cache memory, and the like. The non-volatile memory includes, for example, a read-only memory (ROM), a hard disk, an erasable programmable read-only memory (EPROM), a portable compact disk read-only memory (CD-ROM), a USB memory, a flash memory, and the like. One or more computer program modules can be stored on the computer-readable storage medium, and the processor 31 can execute the one or more computer program modules to implement various functions of the electronic device 30. The computer-readable storage medium can further store various application programs and various data, various data used and/or generated by the application programs, and the like.

It should be noted that, in the embodiments of the present disclosure, the specific functions and technical effects of the electronic device 30 may be referred to the description of the iOS application program construction method above, which will not be repeated here.

Figure 17:
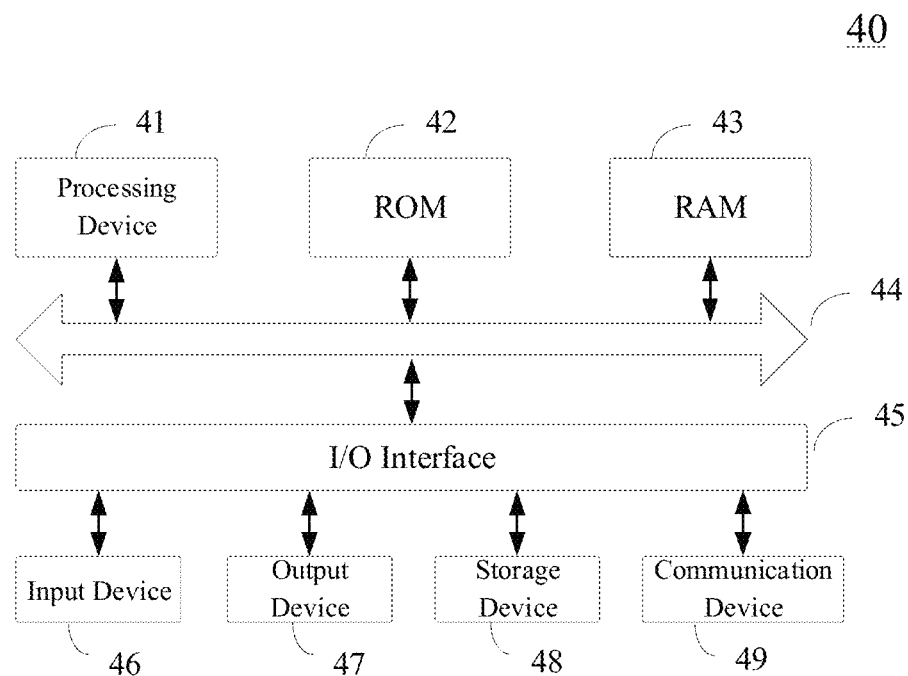
FIG. 17 is a schematic block diagram of another electronic device provided by some embodiments of the present disclosure.

FIG. 17 is a schematic block diagram of another electronic device provided by some embodiments of the present disclosure. The electronic device 40 is, for example, suitable for implementing the iOS application program construction method provided by the embodiments of the present disclosure. The electronic device 40 may be terminal device, or a server, or the like. It should be noted that the electronic device 40 illustrated in FIG. 17 is only an example, which does not impose any limitation on the function and scope of use of the embodiments of the present disclosure.

As illustrated in FIG. 17, the electronic device 40 may include a processing device 41 (e.g., a central processing unit, a graphics processing unit, etc.), and the processing device 41 can perform various appropriate actions and processes according to a program stored in a read-only memory (ROM) 42 or a program loaded from a storage device 48 into a random access memory (RAM) 43. The RAM 43 further stores various programs and data necessary for the operations of the electronic device 40. The processing device 41, the ROM 42, and the RAM 43 are connected to each other through a bus 44. An input/output (I/O) interface 45 is also connected to the bus 44.

Typically, the following devices may be connected to the I/O interface 45: an input device 46 including, for example, a touch screen, a touchpad, a keyboard, a mouse, a camera, a microphone, an accelerometer, a gyroscope, etc.; an output device 47 including, for example, a liquid crystal display (LCD), a speaker, a vibration, etc.; a storage device 48 including, for example, a magnetic tape, a hard disk, etc.; and a communication device 49. The communication device 49 can allow the electronic device 40 to communicate wirelessly or wired with other electronic device to exchange data. While FIG. 17 illustrates the electronic device 40 having various devices, it should be understood that not all of the illustrated devices are required to be implemented or provided, and the electronic device 40 may be alternatively implemented or provided with more or fewer devices.

For example, according to the embodiments of the present disclosure, the iOS application program construction method illustrated in FIG. 2 can be implemented as a computer software program. For example, the embodiments of the present disclosure include a computer program product including a computer program carried on a non-transitory computer-readable medium, and the computer program includes program codes for executing the above-mentioned iOS application program construction method. In such an embodiment, the computer program is downloaded and installed from the network via the communication device 49, installed from the storage device 48, or installed from the ROM 42. When the computer program is executed by the processing device 41, the functions defined in the iOS application program construction method provided by the embodiments of the present disclosure can be implemented.

At least one embodiment of the present disclosure further provides a storage medium for storing non-transitory computer-readable instructions, when the non-transitory computer-readable instructions are executed by a computer, the iOS application program construction method described in any embodiment of the present disclosure can be implemented. By utilizing this storage medium, an automated component construction process can be provided, which can solve the problem of coupling of the main project, enable the main project to be templated without any business code, realize insensible packaging, avoid developers from manually configuring projects, reduce the workload of componentized application construction, and improve the development efficiency.

Figure 18:
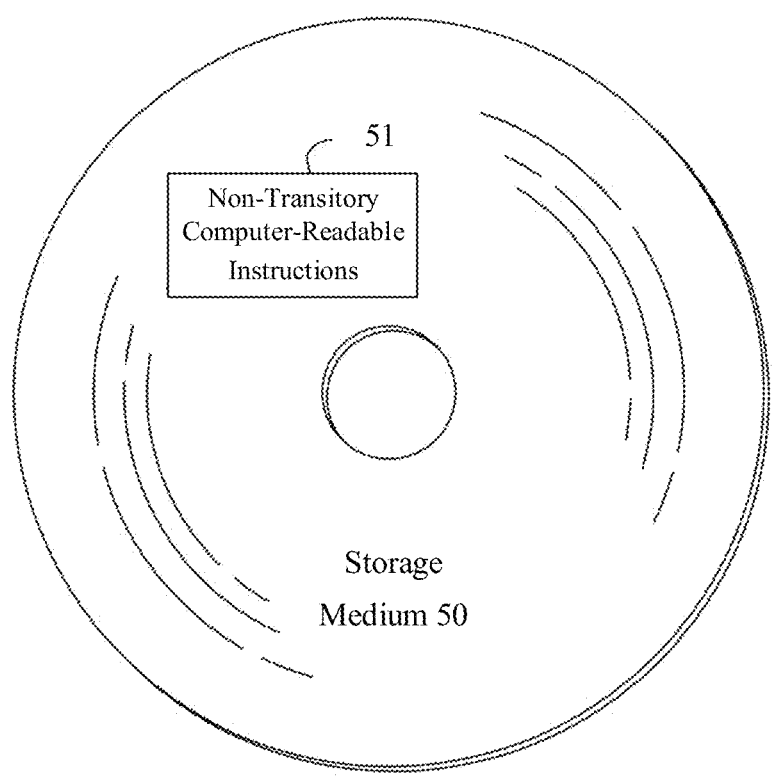
FIG. 18 is a schematic diagram of a storage medium provided by some embodiments of the present disclosure.

FIG. 18 is a schematic diagram of a storage medium provided by some embodiments of the present disclosure. As illustrated in FIG. 18, the storage medium 50 stores non-transitory computer-readable instructions 51. For example, the non-transitory computer-readable instructions 51, when executed by a computer, can perform one or more steps in the iOS application program construction method according to the above description.

For example, the storage medium 50 can be applied to the above-mentioned electronic device. For example, the storage medium 50 can be the memory 32 in the electronic device 30 illustrated in FIG. 16. For example, the relevant description about the storage medium 50 may be referred to the corresponding description of the memory 32 in the electronic device 30 illustrated in FIG. 16, which will not be repeated here.

The following statements should be noted.

(1) The drawings of the present disclosure involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. An iOS application program construction method, comprising:
configuring project information;
based on the project information and at least one target component, utilizing a compilation management service and employing a script to configure a preset project, so as to obtain a target project; and
packaging the target project by utilizing a packaging system to obtain an iOS application program corresponding to the target project;
wherein based on the project information and the at least one target component, utilizing the compilation management service and employing the script to configure the preset project, so as to obtain the target project, comprises:
transmitting the project information to an operating system by utilizing the compilation management service, and generating the script based on the project information; and
executing the script to configure the preset project based on the at least one target component, so as to obtain the target project;
wherein executing the script to configure the preset project based on the at least one target component, so as to obtain the target project, comprises:
executing the script to copy a template project to a preset folder, so as to obtain the preset project;
executing the script to modify a name of the preset project, a name of the preset folder, an application program identification number, an application program version number, and an application program name;
executing the script to inject an entry configuration code and bind an entry configuration component to a lifecycle management module of the preset project;
executing the script to import image resources of an application icon and a launch image into the preset project; and
executing the script to configure a dependency library management project,
wherein the target project is a project obtained after configuring the preset project.

2. The method according to claim 1, wherein the entry configuration code is configured to, after being compiled, execute:
transmitting an entry template style to the entry configuration component by utilizing the compilation management service;
sequentially importing the at least one target component into the entry configuration component, wherein the target component comprises a business component or a functional component; and
introducing an entry component by utilizing the entry configuration component and causing the entry component to return to a sub-controller, and directing the sub-controller to a router controller of a main window.

3. The method according to claim 2, wherein introducing the entry component by utilizing the entry configuration component and causing the entry component to return to the sub-controller, and directing the sub-controller to the router controller of the main window, comprises:
importing the entry template style, content of the target component, an order of the target component, and an icon and a name corresponding to the target component into the entry component by utilizing the entry configuration component;
causing the entry component to return to the sub-controller; and
directing the sub-controller to the router controller of the main window by utilizing the entry configuration component.

4. The method according to claim 3, wherein the router controller of the main window is of TabBar type.

5. The method according to claim 2, wherein the entry configuration component further introduces a lifecycle component, the lifecycle component comprises a module array, and the module array comprises a class of the target component; and
the lifecycle component is configured to receive a lifecycle management message from the lifecycle management module through the entry configuration component, determine a target component that needs to be notified based on the class of the target component, and forward the lifecycle management message to the target component that needs to be notified.

6. The method according to claim 1, wherein configuring the project information comprises:
configuring the project information by utilizing an information receiving entry provided by an open platform.

7. The method according to claim 6, wherein the project information comprises at least one selected from a group consisting of: an application program name, an application program identification number, an application program version number, uniform resource location splicing of an application icon, resource name splicing of the application icon, uniform resource location splicing of a launch image, resource name splicing of the launch image, a project name, a package name, a name of a public library, a version of the public library, name splicing of a private library, address splicing of the private library, and version splicing of the private library.

8. The method according to claim 6, wherein configuring the project information by utilizing the information receiving entry provided by the open platform, comprises:
jumping to an application management interface in response to receiving a click instruction for an application management icon provided by the open platform; and
in response to receiving a click instruction for a save icon of a creating application tab page of the application management interface, acquiring the project information input in a dialog box of the creating application tab page, so as to implement configuration of the project information,
wherein the dialog box is the information receiving entry provided by the open platform.

9. The method according to claim 1, wherein packaging the target project by utilizing the packaging system to obtain the iOS application program corresponding to the target project comprises:
accessing the packaging system, executing the script to modify a packaging theme and a packaging mode, and packaging the target project, so as to obtain the iOS application program.

10. The method according to claim 1, further comprising:
uploading the iOS application program to an open platform, and generating a download identification for downloading the iOS application program.

11. The method according to claim 10, wherein the download identification is a two-dimensional code.

12. The method according to claim 1, further comprising:
establishing a private library based on a dependency library management project component template.

13. The method according to claim 12, wherein codes of the private library are stored in a code repository, and the private library comprises a plurality of business components and a plurality of functional components.

14. The method according to claim 1, further comprising: establishing the template project by utilizing an integrated development tool.

15. The method according to claim 14, wherein the template project comprises a content.jason file, and the content.jason file is configured to perform instrumentation of the image resources of the application icon and the launch image.

16. An electronic device, comprising:
a processor; and
a memory, comprising one or more computer program modules,
wherein the one or more computer program modules are stored in the memory and configured to be executed by the processor, and the one or more computer program modules comprise instructions for implementing the iOS application program construction method according to claim 1.

17. A non-transitory computer-readable storage medium for storing computer-readable instructions, wherein, when executed by a computer, the computer-readable instructions are capable of implementing the iOS application program construction method according to claim 1.

* * * * *

UNITED STATES PATENT AND TRADEMARK OFFICE
CERTIFICATE OF CORRECTION

| | | |
|---|---|---|
| PATENT NO. | : 12,093,668 B2 | Page 1 of 1 |
| APPLICATION NO. | : 17/913884 | |
| DATED | : September 17, 2024 | |
| INVENTOR(S) | : Sujia Jiang et al. | |

It is certified that error appears in the above-identified patent and that said Letters Patent is hereby corrected as shown below:

On the Title Page

(73) Assignee should read: BOE TECHNOLOGY GROUP CO., LTD., Beijing (CN)

Signed and Sealed this
Tenth Day of December, 2024

Katherine Kelly Vidal
*Director of the United States Patent and Trademark Office*